US009264337B2

(12) United States Patent
Oda et al.

(10) Patent No.: US 9,264,337 B2
(45) Date of Patent: Feb. 16, 2016

(54) SERVICE MONITORING SYSTEM, SERVICE MONITORING METHOD, AND NON-TRANSITORY COMPUTER-READABLE RECORDING MEDIUM

(75) Inventors: Takuya Oda, Tokyo (JP); Daisuke Iizuka, Tokyo (JP)

(73) Assignee: HITACHI, LTD., Tokyo (JP)

(*) Notice: Subject to any disclaimer, the term of this patent is extended or adjusted under 35 U.S.C. 154(b) by 277 days.

(21) Appl. No.: 14/000,778

(22) PCT Filed: Feb. 25, 2011

(86) PCT No.: PCT/JP2011/054352
§ 371 (c)(1),
(2), (4) Date: Oct. 16, 2013

(87) PCT Pub. No.: WO2012/114515
PCT Pub. Date: Aug. 30, 2012

(65) Prior Publication Data
US 2014/0044004 A1 Feb. 13, 2014

(51) Int. Cl.
*H04L 12/26* (2006.01)
*H04L 12/24* (2006.01)
*G06F 11/34* (2006.01)

(52) U.S. Cl.
CPC ........ *H04L 43/0888* (2013.01); *G06F 11/3409* (2013.01); *G06F 11/3495* (2013.01); *H04L 41/5067* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 2002/0075809 | A1* | 6/2002 | Phaal | 370/245 |
| 2003/0055946 | A1* | 3/2003 | Amemiya | 709/224 |
| 2007/0022327 | A1* | 1/2007 | Otsuka et al. | 714/47 |
| 2010/0278054 | A1* | 11/2010 | Dighe | 370/252 |
| 2011/0276682 | A1* | 11/2011 | Ding et al. | 709/224 |

FOREIGN PATENT DOCUMENTS

| | | |
|---|---|---|
| JP | 2000-090026 A | 3/2000 |
| JP | 2008-084083 A | 4/2008 |
| JP | 2008-092520 A | 4/2008 |
| JP | 4294673 A | 4/2009 |
| JP | 2010-245710 A | 10/2010 |

* cited by examiner

*Primary Examiner* — Kodzovi Acolatse
(74) *Attorney, Agent, or Firm* — Volpe and Koenig, P.C.

(57) ABSTRACT

A monitoring system for providing services to clients as an embodiment of the present invention is characterized in that upon determining whether or not termination times of the service-providing computers currently acquiring packets have been reached, service-providing computers that constitute a service-providing system other than the service-providing system constituted by the service-providing computers that have reached the termination times are selected as new packet acquisition destinations.

13 Claims, 18 Drawing Sheets

MONITORING TARGET SERVER TABLE 610

| BUSINESS OPERATION SYSTEM IDENTIFIER | URL | SERVER ADDRESS | PORT NUMBER | MONITORING TIME (msec) |
|---|---|---|---|---|
| BUSINESS OPERATION SYSTEM A | http://www.serviceA.com/home.html | 192.168.0.2 | 80 | 8000 |
| BUSINESS OPERATION SYSTEM A | http://www.serviceA.com/search.html | 192.168.0.4 | 80 | 15000 |
| BUSINESS OPERATION SYSTEM A | http://www.serviceA.com/registration.html | 192.168.10.2 | 80 | 12000 |
| BUSINESS OPERATION SYSTEM B | http://www.serviceB.com/* | 192.168.0.10 | 80 | 8000 |
| BUSINESS OPERATION SYSTEM B | ftp://ftp.serviceA.com/* | 192.168.10.11 | 21 | 9000 |
| BUSINESS OPERATION SYSTEM C | http://www.serviceC.com/* | 192.168.100.2 | 80 | 10000 |
| BUSINESS OPERATION SYSTEM D | https://www.serviceD.com/* | 192.168.100.11 | 443 | 11000 |

NETWORK CONFIGURATION TABLE 620

| NETWORK SWITCH IDENTIFIER | PORT | SERVER ADDRESS |
|---|---|---|
| 192.168.0.1 | 02 | 192.168.0.2 |
| 192.168.0.1 | 03 | 192.168.0.3 |
| 192.168.0.1 | 04 | 192.168.0.4 |
| 192.168.0.1 | 05 | 192.168.0.5 |
| 192.168.0.1 | 06 | 192.168.0.6 |
| 192.168.0.1 | 10 | 192.168.0.10 |
| 192.168.0.1 | 11 | 192.168.0.11 |
| 192.168.10.1 | 02 | 192.168.10.2 |
| 192.168.10.1 | 03 | 192.168.10.3 |
| 192.168.10.1 | 04 | 192.168.10.4 |
| 192.168.10.1 | 11 | 192.168.10.11 |
| 192.168.10.1 | 12 | 192.168.10.12 |
| 192.168.10.1 | 13 | 192.168.10.13 |
| 192.168.100.1 | 02 | 192.168.100.2 |
| 192.168.100.1 | 03 | 192.168.100.3 |
| 192.168.100.1 | 04 | 192.168.100.4 |
| 192.168.100.1 | 10 | 192.168.100.10 |
| 192.168.100.1 | 11 | 192.168.100.11 |
| 192.168.100.1 | 12 | 192.168.100.12 |

NETWORK SWITCH SETTING METHOD TABLE 630

| NETWORK SWITCH IDENTIFIER (631) | MIRRORING SETTING METHOD (632) |
|---|---|
| 192.168.0.1 | WebAccess: "http://192.168.0.1/setting/mirrorsetting.jsp?mirrorport='PORT_ID'&targetport='TARGET_ID'" |
| 192.168.10.1 | Command: "mrcfg mirrorport PORT_ID targetport TARGET_ID now user root password ********" |
| 192.168.100.1 | WebAccess: "http://192.168.100.1/mirrorsetting.jsp?irrorport='PORT_ID'&targetport='TARGET_ID'" |

*FIG. 5*

SLA TABLE 640

| BUSINESS OPERATION SYSTEM IDENTIFIER | RESPONSE TIME THRESHOLD (msec) | TOLERABLE OVERRUN COUNT (PER MONTH) | RESPONSE TIME (msec) | RESPONSE TIME OVERRUN COUNT |
|---|---|---|---|---|
| BUSINESS OPERATION SYSTEM A | 15,000 | 3 TIMES | 5.256 | 1 |
| BUSINESS OPERATION SYSTEM B | 10,000 | 5 TIMES | 2.856 | 0 |
| BUSINESS OPERATION SYSTEM C | 5,000 | TWICE | 0.756 | 0 |

*FIG. 6*

MONITORING END TIME TABLE 650

| BUSINESS OPERATION SYSTEM IDENTIFIER | SERVER ADDRESS | MONITORING END TIME | REQUEST PACKET FLAG |
|---|---|---|---|
| BUSINESS OPERATION SYSTEM A | 192.168.0.2 | 2011/01/01 01:01:16.000 | ON |
| BUSINESS OPERATION SYSTEM A | 192.168.10.2 | 2011/01/01 01:01:14.028 | OFF |
| BUSINESS OPERATION SYSTEM C | 192.168.100.2 | 2011/01/01 01:01:18.028 | OFF |

*FIG. 7*

REQUEST TABLE  660

| 661 | 662 | 663 | 664 | 665 | 666 |
|---|---|---|---|---|---|
| RECEIVED TIME | NEXT SEQUENCE NUMBER | SENDER ADDRESS | SENDER PORT NUMBER | DESTINATION ADDRESS | DESTINATION PORT NUMBER |
| 2010/12/31 23:59:59.982 | 326 | 63.74.233.45 | 2247 | 192.168.100.2 | 80 |
| 2010/12/31 23:59:59.038 | 387 | 158.214.82.80 | 1645 | 192.168.100.2 | 80 |
| 2010/12/31 23:59:58.880 | 6535 | 128.241.23.25 | 1415 | 192.168.0.2 | 80 |
| 2010/12/31 23:59:58.644 | 611 | 133.145.224.19 | 2895 | 192.168.0.4 | 80 |
| 2010/12/31 23:59:58.002 | 428 | 133.145.160.224 | 1258 | 192.168.0.2 | 80 |
| 2010/12/31 23:59:57.995 | 428 | 133.145.160.224 | 1258 | 192.168.0.2 | 80 |

*FIG. 8*

RESPONSE TABLE 670

| RESPONSE TIME | ACK SEQUENCE NUMBER | SENDER ADDRESS | SENDER PORT NUMBER | DESTINATION ADDRESS | DESTINATION PORT NUMBER | RESPONSE RESULT |
|---|---|---|---|---|---|---|
| 00:00:00.200 | 428 | 192.168.0.2 | 80 | 133.145.160.224 | 1258 | HTTP1.1 200 OK |
| 00:00:00.216 | 611 | 192.168.0.4 | 80 | 133.145.224.19 | 2895 | HTTP1.1 200 OK |
| 00:00:01:025 | 428 | 192.168.0.2 | 80 | 133.145.160.224 | 1258 | HTTP1.1 200 OK |
| 00:00:00.316 | 6535 | 192.168.0.2 | 80 | 128.241.23.25 | 1415 | HTTP1.1 200 OK |

Columns: 671, 672, 673, 674, 675, 676, 677

*FIG. 9*

MIRRORING SETTINGS TABLE 680

| NETWORK SWITCH IDENTIFIER (681) | MIRROR PORT (682) | MONITORING TARGET PORT (683) | MIRRORING SETTINGS CHANGING METHOD (684) |
|---|---|---|---|
| 192.168.0.1 | 0 | 10 | WebAccess: "http://192.168.0.1/setting/mirrorsetting.jsp?mirrorport='0'&targetport='10'" |
| 192.168.10.1 | 0 | 11 | Command: "mrcfg mirrorport 0 targetport 11 now user root password ********" |
| 192.168.100.1 | 0 | 11 | WebAccess: "http://192.168.100.1/mirrorsetting.jsp?mirrorport='0'&targetport='11'" |

*FIG. 10*

VIRTUAL SERVER CONFIGURATION TABLE 690

| VIRTUAL SERVER ADDRESS | COMMUNICATION DESTINATION SERVER ADDRESS | VIRTUAL SERVER-HOSTING PHYSICAL SERVER ADDRESS | MIGRATION DESTINATION PHYSICAL SERVER ADDRESS |
|---|---|---|---|
| 192.168.100.2 | 192.168.100.3 *(EXTERNAL NW) | 192.168.100.100 | 192.168.100.110 192.168.100.120 |
| 192.168.100.3 | 192.168.100.2 192.168.100.4 | 192.168.100.100 | 192.168.100.110 192.168.100.120 |
| 192.168.100.4 | 192.168.100.3 | 192.168.100.100 | 192.168.100.110 192.168.100.120 |
| 192.168.0.10 | 192.168.0.11 *(EXTERNAL NW) | 192.168.0.100 | NIL |
| 192.168.0.11 | 192.168.0.10 | 192.168.0.100 | NIL |

*FIG. 14*

SERVER SPEC. TABLE  700

| 701 | 702 | 703 | 704 | 705 | 706 |
|---|---|---|---|---|---|
| PHYSICAL SERVER ADDRESS | VIRTUALIZING SOFTWARE | CPU UTILIZATION RATIO | MEMORY UTILIZATION RATIO | DISK UTILIZATION RATIO | NW BAND UTILIZATION RATIO |
| 192.168.100.100 | SERVER VIRTUALIZING SOFTWARE 01 | 62.1 | 65.5 | 66.4 | 57.6 |
| 192.168.100.110 | SERVER VIRTUALIZING SOFTWARE 01 | 55.3 | 61.0 | 43.8 | 69.4 |
| 192.168.100.120 | SERVER VIRTUALIZING SOFTWARE 01 | 18.6 | 12.5 | 17.9 | 23.2 |
| 192.168.0.100 | SERVER VIRTUALIZING SOFTWARE 02 | 61.4 | 59.1 | 63.4 | 54.1 |

*FIG. 15*

VIRTUAL SERVER SPEC. TABLE  710

| 711 | 712 | 713 | 714 | 715 |
|---|---|---|---|---|
| VIRTUAL SERVER ADDRESS | CPU UTILIZATION RATIO | MEMORY UTILIZATION RATIO | DISK UTILIZATION RATIO | NW BAND UTILIZATION RATIO |
| 192.168.100.2 | 10.3 | 11.2 | 10.8 | 15.7 |
| 192.168.100.3 | 28.2 | 29.8 | 27.6 | 17.8 |
| 192.168.100.4 | 17.5 | 23.2 | 19.2 | 16.5 |
| 192.168.0.10 | 22.3 | 21.5 | 20.9 | 24.8 |
| 192.168.0.11 | 13.7 | 11.2 | 15.2 | 16.8 |

*FIG. 16*

MIRROR PORT COUNT DEFINITION TABLE
720

SERVICE MONITORING SYSTEM, SERVICE MONITORING METHOD, AND NON-TRANSITORY COMPUTER-READABLE RECORDING MEDIUM

BACKGROUND OF THE INVENTION

This invention relates to a monitoring system for monitoring the performance of a business operation system, and more particularly, to a business operation monitoring system for monitoring the performance of a business operation system by obtaining packets from a business operation executing computer that executes the business operation system.

Monitoring that is in demand in recent years is conducted for each business operation system provided to a customer, instead of each of individual platforms (for example, a business operation executing computer (business operation executing server), storage, and a network) that constitute a business operation system. There is also a demand from administrators which is to monitor a business operation system without changing the configuration of the business operation system.

A technology of monitoring a business operation executing server has been known in which packets of the business executing server are obtained by utilizing a mirror port of a network switch (referred to as switch) described below.

Specifically, the switch selects at least one of ports of the network switch (mirroring (monitoring) target port) and copies, through mirroring, packets flowing through the port to a mirror port. A management computer (management server) connected to the mirror port obtains the mirrored packets from the mirror port. The management server uses the obtained packets to measure the perceived performance of a business operation system that is felt by end users who use the business operation system, and thereby monitor the response performance of the business operation system.

In the monitoring of a business operation system that uses a mirror port, when the count of mirror ports is smaller than the count of monitoring target ports, there is a chance that more packets than the mirror ports can process flow into the mirror ports. In that event, packet loss occurs and the performance of the switch itself drops as well.

As a countermeasure, a technology is known with which monitoring target ports that are actually monitored by the management server are narrowed down in advance, thereby preventing the copying, through mirroring, of unnecessary packets to mirror ports and accomplishing efficient monitoring (see Patent Literature 1, for example).
Patent Literature 1: Japanese Patent No. 4294673 B2

SUMMARY OF THE INVENTION

In Patent Literature 1, even in the case where all other ports than mirror ports of the switch are monitoring target ports, only packets necessary for monitoring are obtained by filtering packets based on the destination address, destination port number, sender address, and sender port number contained in the packet.

However, when too many request packets are transmitted from client computers used by users, the switch needs to set enough mirror ports to process the received request packets because request packets are packets necessary for monitoring. Otherwise packet loss occurs and the performance of the switch itself drops as well.

This problem could be solved by using as many mirror ports as the count of monitoring target ports, except that then the building of a system for cases where as many mirror ports as the count of monitoring target ports are not used would require twice more switches as well as twice more network interface cards (NICs) for the server that receives packets transmitted from the switches. Using as many mirror ports as the count of monitoring target ports therefore requires huge cost.

In the case where only specific monitoring target ports are monitored by limiting the count of monitoring target ports, other ports than the monitoring target ports cannot be monitored. For instance, when a switch has Port A, Port B, and Port C which are connected to three business' operation executing servers, and Port A and Port B are monitoring target ports, a failure in the business operation executing server that is connected to Port C cannot be detected.

It is therefore necessary to monitor as many business operation executing servers as possible while cutting the cost of switches and ultimately the cost of monitoring by minimizing the count of mirror ports configured in switches.

In view of the above, an object of this invention is to provide a business operation monitoring system that monitors as many business operation executing servers as possible while executing the monitoring of business operation executing computers on a business operation system-by-business operation system basis and cutting the cost of monitoring.

An embodiment of this invention is a business operation monitoring system, which is capable of holding communication to and from a plurality of business operation executing computers included in a plurality of business operation systems for providing business operations to a customer, and which obtains packets from the plurality of business operation executing computers to monitor the plurality of business operation systems. Each of the plurality of business operation systems comprises at least one of the plurality of business operation executing computers. The business operation monitoring system is configured to: store, in a storage area, a business operation executing computer table for managing which business operation executing computer the each of the plurality of business operation systems comprises, and an end time table for managing, for each of the plurality of business operation executing computers, an end time at which the obtainment of the packets from the each of the plurality of business operation executing computers is ended; refer to the end time table to determine whether or not the end time has arrived for one of the plurality of business operation executing computers from which a packet is are currently obtained; refer, when it is determined that the end time has arrived, to the business operation executing computer table to select, as a new monitoring target, one of the plurality of business operation executing computers included in other business operation systems than one of the plurality of business operation systems that comprises the one of the plurality of business operation executing computers for which the end time has arrived; register the end time of the one of the plurality of business operation executing computers selected as the new monitoring target in the end time table; and obtain a packet from the one of the plurality of business operation executing computers selected as the new monitoring target.

According to one embodiment of this invention, it is possible to provide the business operation monitoring system that monitors as many business operation executing servers as possible while executing the monitoring of business operation executing computers on a business operation system-by-business operation system basis and cutting the cost of monitoring.

BRIEF DESCRIPTION OF THE DRAWINGS

FIG. 3 is an explanatory diagram of a monitoring target server table according to the first embodiment of this invention.

FIG. 5 is an explanatory diagram of a network switch setting method table according to the first embodiment of this invention.

FIG. 6 is an explanatory diagram of an SLA table according to the first embodiment of this invention.

FIG. 7 is an explanatory diagram of a monitoring end time table according to the first embodiment of this invention.

FIG. 8 is an explanatory diagram of a request table according to the first embodiment of this invention.

FIG. 9 is an explanatory diagram of a response table according to the first embodiment of this invention.

FIG. 10 is an explanatory diagram of a mirroring settings table according to the first embodiment of this invention.

FIG. 14 is an explanatory diagram of a virtual server configuration table according to a second embodiment of this invention.

FIG. 15 is an explanatory diagram of a server spec. table according to the second embodiment of this invention.

FIG. 16 is an explanatory diagram of a virtual server spec. table according to the second embodiment of this invention.

DETAILED DESCRIPTION OF THE EMBODIMENTS

Modes of carrying out this invention are described below with reference to the drawings. To present a clearer picture, some things are omitted or simplified in the following description and the drawings as seen fit. The same components in one drawing and another drawing are denoted by the same reference symbols, and duplicate descriptions are omitted if necessary for clarification.

In embodiments of this invention, when monitoring that involves obtaining packets from a business operation executing computer that is included in a business operation system ends due to the elapse of a given length of time, monitoring is started for a business operation executing computer that is included in another business operation system.

Business operation executing computers monitored on a business operation system-by-business operation system basis are switched in this manner, thereby accomplishing the monitoring of business operation executing computers that is executed for each business operation system separately. In addition, because business operation systems to be monitored are switched based on the passage of time, as many business operation executing servers as possible are monitored.

First Embodiment

A first embodiment of this invention is described below with reference to FIGS. 1 to 13.

Figure 1:
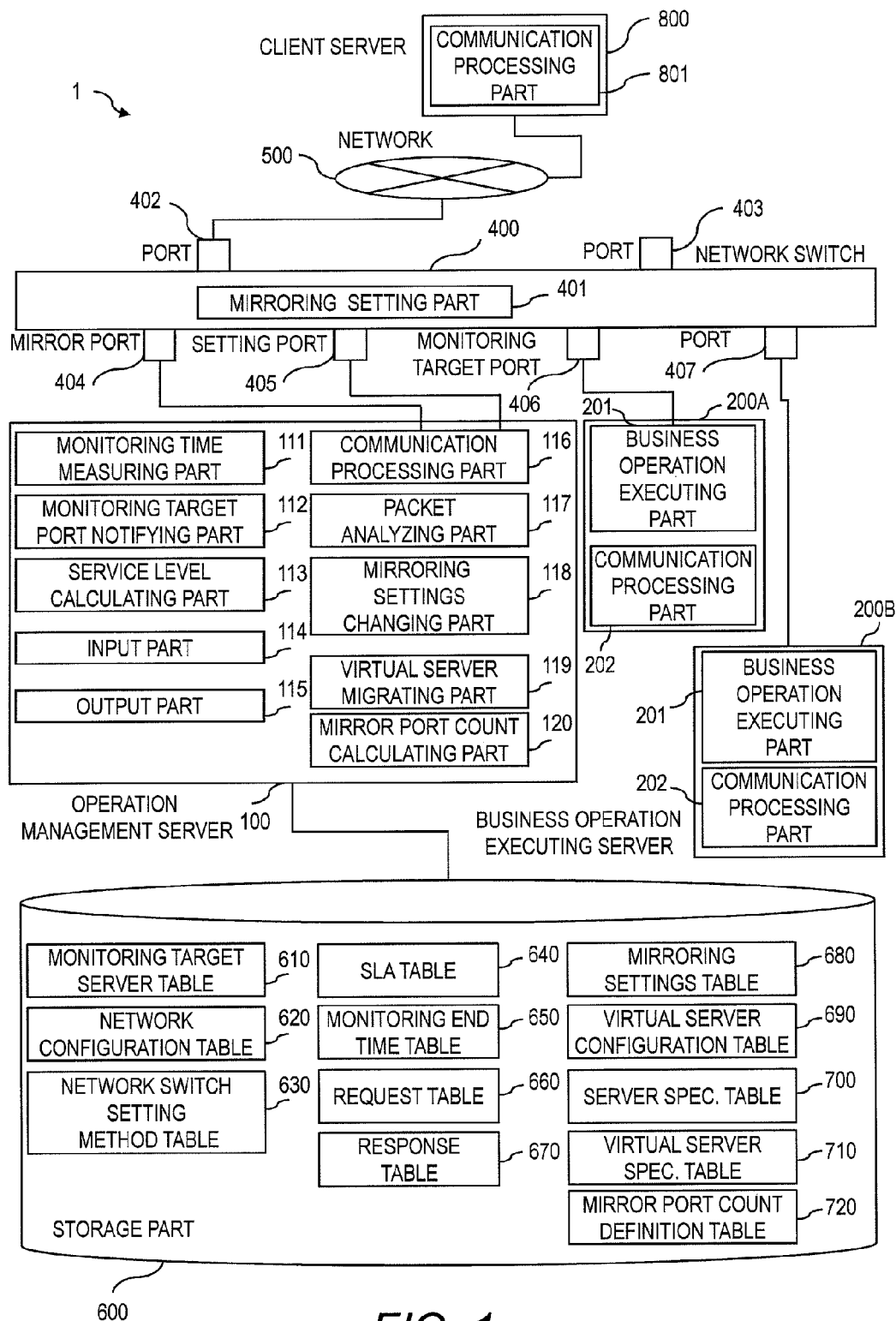
FIG. 1 is a block diagram illustrating the configuration of a monitoring system according to a first embodiment of this invention.

FIG. 1 is a block diagram illustrating the configuration of a monitoring system 1 according to the first embodiment of this invention.

The monitoring system 1 of this embodiment includes an operation management server (business operation monitoring system) 100, a plurality of business operation executing servers 200 (business operation executing computers) 200, a client server (client computer) 800, and a network switch (communication device) 400.

In FIG. 1, the client server 800 is coupled to the network switch 400 via a network 500. The client server 800 may instead be connected to a port 403 provided in the network switch 400 without the intervention of the network 500.

The plurality of business operation executing servers 200 and the client server 800 can hold communication to and from each other via the network switch 400.

The operation management server 100, the business operation executing servers 200, and the client server 800 are computers having a general hardware configuration. Specifically, the servers each include, among others, a CPU, a memory (RAM, ROM, or the like), a data input/output interface, a communication interface (network interface card (NIC) or the like), an auxiliary storage device for storing a software program or the like (disk device or the like), an input device (keyboard, mouse, and the like), and a display device.

In each of the operation management server 100, the business operation executing servers 200, and the client server 800, processing of a processing part (for example, a monitoring time measuring part 111 of the operation management server 100) is implemented by the CPU by reading a program that is stored in the auxiliary storage device onto the memory, and executing the program read onto the memory.

The business operation executing servers 200 are described first.

The business operation executing servers 200 constitute business operation systems which provide business operations to customers. The association between the business operation executing servers 200 and business operation systems are not limited to a one-on-one basis. In other words, one business operation system may be comprised of one business operation executing server 200 or a plurality of business operation executing servers 200. A plurality of business operation systems may be comprised of one business operation executing server 200 or a plurality of business operation executing servers 200.

Each business operation executing server 200 includes a business operation executing part 201 and a communication processing part 202. The business operation executing part 201 executes at least a part of business operation processing necessary to run a company. Business operations necessary to run a company are, for example, sales, production, accounting, and logistics. Representative business operation systems are a financial management system, a paycheck management system, an online purchase system, a sales management system, and the like.

The communication processing part 202 executes communication processing for communication between its own business operation executing server 200 and the operation management server 100, the other business operation executing servers 200, and the client server 800.

The client server 800 is described next.

The client server 800 is a computer to which business operations are provided by business operation systems. The client server 800 transmits a request packet described later to one of the business operation executing servers 200 and receives a response packet from this business operation executing server 200.

A communication processing part 801 executes communication processing for communication between the client server and the business operation executing servers.

In the case where a business operation provided by a business operation system that includes one of the business operation executing servers 200 is used by another business operation executing server 200, the other business operation executing server 200 transmits a request packet and receives a response packet, and this business operation executing server 200 that transmits the request packet also functions as the client server 800. Therefore, the business operation executing server 200 that transmits a request packet is written as the client server 800.

The network switch 400 is described next.

The network switch 400 is network equipment for controlling communication in business operation systems managed by the operation management server 100. Specifically, the network switch 400 controls communication between one of the business operation executing servers 200 constituting business operation systems and the client server 800 that transmits a request packet to this business operation executing server 200, communication between one business operation executing server 200 and another, and communication between the business operation executing servers 200 and the operation management server 100.

The network switch 400 may be connected to one business operation system or a plurality of business operation systems. A plurality of network switches 400 may share one business operation system.

The network switch 400 may have a single-stage configuration where only servers such as the business operation executing servers 200 are connected, or may have a multi-stage configuration where another network switch 400 to which servers such as the business operation executing servers 200 are connected is connected.

The network switch 400 includes a mirroring configuring part 401 and a plurality of ports, 402 to 407.

The mirroring configuring part 401 executes, for the ports 402 to 407 of the network switch 400, mirror port configuring processing in which ports to operate as mirror ports are set, and monitoring target port setting processing in which ports to be monitored (mirrored) (monitoring target ports) are set.

In FIG. 1, a port set as a mirror port is illustrated as the port 404 and a port set as a monitoring target port is illustrated as the port 406. A setting port that receives a command to switch monitoring target ports or other commands from the operation management server 100 is illustrated as a port 405.

The network switch 400 copies through mirroring a packet that passes through a monitoring target port, and outputs the mirrored packet to a mirror port. When connected to the mirror port, the operation management server 100 can therefore obtain, via the mirror port, packets passing through the monitoring target port.

The count of mirror ports set in the network switch 400 is not limited to one and a plurality of mirror ports may be set. This embodiment takes as an example the case where one mirror port is set. In the example described in this embodiment, packets that pass through one monitoring target port are mirrored to one mirror port. However, packets that pass through one monitoring target port and packets that pass through another monitoring target port may be mirrored to one mirror port.

The mirror port 404 and the setting port 405 are connected to the operation management server 100, the monitoring target port 406 is connected to one of the business operation executing servers 200, and the port 407 is connected to another business operation executing server 200.

The operation management server 100 is described next.

The operation management server 100 manages information about the running of a plurality of business operation systems (for example, load information, failure information, and maintenance information), and is connected to the mirror port 404 and the setting port 405 which are provided in the network switch 400.

The operation management server 100 has a mirroring setting function and a packet analyzing function. The mirroring setting function is a function of setting, via the setting port 405, the switching of monitoring target ports of the mirror port 404. The packet analyzing function is a function of obtaining via the mirror port 404 a packet that passes through a monitoring target port, analyzing the obtained packet, and monitoring the response performance of the business operation executing server 200 included in the relevant business operation system.

The operation management server 100 includes the monitoring time measuring part 111, a monitoring target port notifying part 112, a service level calculating part 113, an input part 114, an output part 115, a communication processing part 116, a packet analyzing part 117, a mirroring settings changing part 118, a virtual server migrating part 119, a mirror port count calculating part 120, and a storage part 600.

The monitoring time measuring part 111 refers to a monitoring end time table 650, which is described later, to determine whether or not the monitoring of a business operation system comes to an end and, when the monitoring of the business operation system ends, notifies the monitoring target port notifying part 112 of the fact.

Monitoring a business operation system means that the operation management server 100 sets, as a monitoring target port, one of the ports of the network switch 400 that is connected to the business operation executing server 200 is included in the business operation system, and obtains, via the mirror port, packets that pass through the monitoring target port.

The monitoring time measuring part 111 changes an end time at which the monitoring of a business operation system ends in the case where a given condition, which is described later, is established.

When notified by the monitoring time measuring part 111 of the fact that the monitoring of a business operation system has ended, the monitoring target port notifying part 112 newly selects as a monitoring target a business operation system that is not the one for which monitoring has just ended. The monitoring target port notifying part 112 registers in a mirroring settings table 680, which is described later (see FIG. 10), the URL of the business operation executing server 200 that is included in the newly selected business operation system, and the port number of a port of the network switch 400 that is connected to this business operation executing server 200 (monitoring target port). The monitoring target port notifying part 112 notifies these (the URL of the business operation executing server 200 and the port number of the monitoring target port) to the mirroring settings changing part 118.

When the operation management server 100 obtains a response packet from one of the business operation executing servers 200, the service level calculating part 113 registers, in a service level agreement (SLA) table 640 (see FIG. 6), a response time which is the length of time till the business operation executing server 200 transmits the response packet since the reception of a request packet.

Figure 2:
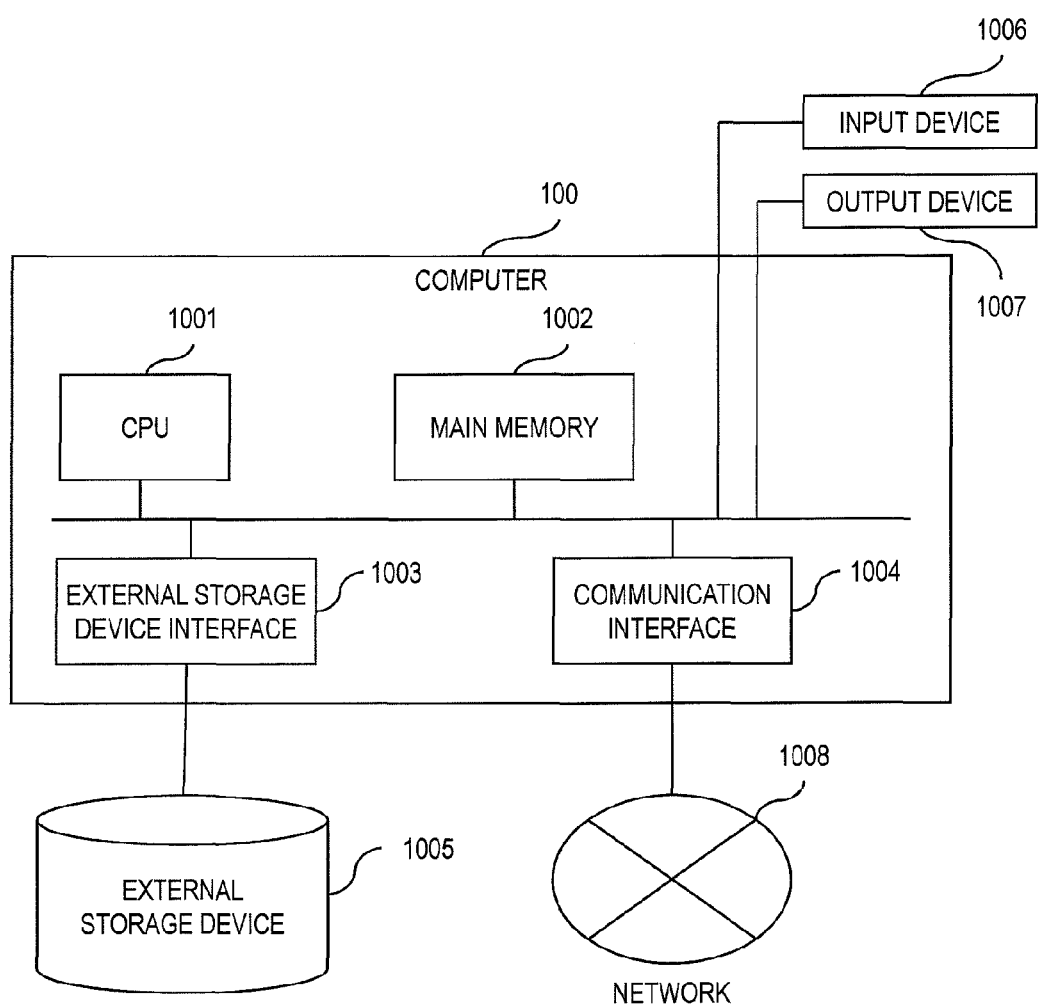
FIG. 2 is a hardware configuration diagram of an operation management server according to the first embodiment of this invention.

The input part 114 is implemented by an input device 1006 illustrated in FIG. 2. The input device 1006 is, for example, a combination of a pointing device such as a mouse and a keyboard.

The output part 115 is implemented by an output device 1007 illustrated in FIG. 2. The output device 1007 is, for example, a combination of a monitor and a printer.

The communication processing part 116 executes communication processing of the operation management server 100. The communication processing part 116 distributes information received through the network switch 400 and the network 500 to each processing part. The communication processing part 116 transmits via the network switch 400 and the network 500 information created by each of the processing parts of the operation management server 100 to be transmitted to the business operation executing servers 200 and the network switch 400.

When a packet is obtained via the mirror port 404, the packet analyzing part 117 determines whether the obtained packet is a request packet or a response packet, and outputs a packet obtainment notification to the monitoring time measuring part 111.

When the obtained packet is determined as a request packet, the packet analyzing part 117 registers the time of reception of the request packet and information contained in the request packet in a request table 660 (see FIG. 8).

When the obtained packet is determined as a response packet, the packet analyzing part 117 identifies a request packet that is associated with the response packet, calculates the response time by subtracting the time of reception of the request packet from the time of reception of the response packet, and registers the calculated response time and information contained in the response packet in a response table 670 (see FIG. 9).

The mirroring settings changing part 118 refers to the mirroring settings table 680 (see FIG. 10), and outputs, via the setting port 405, to the mirroring setting part 401 of the network switch 400, an instruction to switch monitoring target ports with the use of a settings changing method that is associated with the network switch 400 whose monitoring target ports are to be switched.

The virtual server migrating part 119 migrates a virtual machine executed in one of the business operation executing servers 200 to another business operation executing server 200. The virtual server migrating part 119 is used in a second embodiment, not in this embodiment, and the operation management server 100 of this embodiment therefore may not include the virtual server migrating part 119.

The mirror port count calculating part 120 calculates the count of mirror ports necessary to securely obtain packets from the business operation executing servers 200 that constitute business operation systems to be monitored. The mirror port count calculating part 120 is used in a third embodiment, not in this embodiment, and the operation management server 100 of this embodiment therefore may not use the mirror port count calculating part 120.

The storage part 600 is a storage area connected to the operation management server 100, and stores a monitoring target server table 610, a network configuration table 620, a network switch setting method table 630, the SLA table 640, the monitoring end time table 650, the request table 660, the response table 670, the mirroring settings table 680, a virtual server configuration table 690, a server spec. table 700, a virtual server spec. table 710, and a mirror port count definition table 720.

The monitoring target server table 610 is table-format data and holds the identifier of a business operation system to be monitored by the operation management server 100, the identifiers of business operation executing servers 200 included in the business operation system, and the lengths of monitoring time of the respective business operation executing servers 200. Details of the monitoring target server table 610 are described with reference to FIG. 3.

The network configuration table 620 is table-format data and holds association relations between the business operation executing servers 200 included in business operation systems and ports of the network switch 400 to which the business operation executing servers 200 are connected. Details of the network configuration table 620 are described with reference to FIG. 4.

The network switch configuring method table 630 is table-format data and holds methods of switching monitoring target ports of the network switch 400. Details of the network switch configuring method table 630 are described with reference to FIG. 5.

The SLA table 640 is table-format data and holds, for each business operation system, a time to be kept by the business operation executing servers 200 included in the business operation system in a business operation provided by the business operation system with regard to a response time, which is measured from the time of reception of a request packet till the return of a response packet, and the response time. Details of the SLA table 640 are described with reference to FIG. 6.

The monitoring end time table 650 is table-format data and holds times at which monitoring is ended for the business operation executing servers 200 included in business operation systems. Details of the monitoring end time table 650 are described with reference to FIG. 7.

The request table 660 is table-format data and holds an obtained time at which a request packet is obtained via the mirror port 404 and information that is contained in the request packet. Details of the request table 660 are described with reference to FIG. 8.

The response table 670 is a table for holding a response time and information that is contained in a response packet obtained via the mirror port. Details of the response table 670 are described with reference to FIG. 9.

The mirroring settings table 680 is table-format data and holds information about monitoring target ports of the mirror port 404 set in the network switch 400. Details of the mirroring settings table 680 are described with reference to FIG. 10.

The virtual server configuration table 690 is table-format data and holds the configurations of virtual servers which are executed in the business operation executing servers 200 included in business operation systems. The virtual server configuration table 690 is used in the second embodiment, not in this embodiment, and may not be stored in the storage part 600 of this embodiment. Details of the virtual server configuration table 690 are described with reference to FIG. 14.

The server spec. table 700 holds, for each business operation executing server 200, the proportions of performance that is in use to the performance of the respective physical components in the business operation executing server 200. The server spec. table 700 is used in the second embodiment, not in this embodiment, and may not be stored in the storage part 600 of this embodiment. Details of the server spec. table 700 are described with reference to FIG. 15.

The virtual server spec table 710 holds, for each virtual server, performance values of the respective physical components of the business operation executing server 200 that are used by the virtual server. The virtual server spec. table 710 is used in the second embodiment, not in this embodiment, and may not be stored in the storage part 600 of this embodiment. Details of the virtual server spec. table 710 are described with reference to FIG. 16.

The mirror port count definition table 720 is table-format data and holds how many mirror ports 404 are necessary for the network switch 400 to monitor ports to which the business operation executing servers 200 included in a monitoring target business operation system are connected. The mirror port count definition table 720 is used in the third embodiment, not in this embodiment, and may not be stored in the storage part 600 of this embodiment. Details of the mirror port count definition table 720 are described with reference to FIG. 18.

FIG. 2 is a hardware configuration diagram of the operation management server 100 according to the first embodiment of this invention.

The operation management server 100 is a computer that includes a CPU 1001, a main memory 1002 (for example, RAM and ROM), an external storage device interface 1003, a communication interface 1004 (for example, NIC), an external storage device 1005 for storing a program or the like (for example, disk device), the input device 1006 (for example, a keyboard and a mouse), and the output device 1007 (a display device, a printer, and the like).

The CPU 1001 loads various programs stored in the external storage device 1005 onto the main memory 1002 to execute the various programs loaded onto the main memory 1002.

The main memory 1002 is a storage area that the CPU 1001 can directly access, for example, a RAM and a ROM.

The external storage device interface 1003 is an interface to which the external storage device 1005 is connected.

The communication interface 1004 is an interface that couples the operation management server 100 to a network 1008, for example, an NIC. The network 1008 includes a network including the network switches 400.

The external storage device 1005 is a storage area for storing various programs, for example, a disk device.

The input device 1006 is a device that receives input operation performed on the operation management server 100 by a user, for example, a mouse and a keyboard.

The output device 1007 is a device from which the operation management server 100 outputs various types of information, for example, a display and a printer.

The monitoring time measuring part 111, the monitoring target port notifying part 112, the service level calculating part 113, the packet analyzing part 117, and the mirroring settings changing part 118 which are illustrated in FIG. 1 are implemented by loading various programs that are stored in the external storage device 1005 onto the main memory 1002 via the external storage device interface 1003, and then executing the programs with the CPU 1001.

While the input part 114 is the input device 1006, the output part 115 is the output device 1007, and the communication processing part 116 is the communication interface 1004 in the description given above with reference to FIG. 1, the input part 114 may be an input control program for controlling the input device 1006, the output part 115 may be an output control program for controlling the output device 1007, and the communication processing part 116 may be a communication control program for controlling the communication interface 1004.

The storage part 600 of FIG. 1 is implemented by the main memory 1002 and/or the external storage device 1005.

The business operation executing servers 200, the network switch 400, and the client server 800 have the same hardware configuration as that of the computer of FIG. 2 which serves as the operation management server 100. However, there may be differences in scale and performance among the hardware configuration of the operation management server 100, the hardware configuration of the business operation executing servers 200, the hardware configuration of the network switch 400, and the hardware configuration of the client server 800.

The components of the operation management server 100 of FIG. 1 may be installed in a plurality of servers, and a business operation executed by the business operation executing servers 200 of FIG. 1 may be executed by a plurality of servers. The network switch 400 of FIG. 1 may be implemented by a plurality of network switches.

The operation management server 100, business operation executing servers 200, and client server 800 of FIG. 1 may all be implemented by a single server. The operation management server 100, the business operation executing servers 200, the network switch 400, and the client server 800 are not limited to physical servers and physical equipment. In other words, the operation management server 100, the business operation executing servers 200, and the client server 800 may be virtual servers, or logical servers which are defined by a cluster configuration or the like. The network switch 400 may be a virtual switch.

FIG. 3 is an explanatory diagram of the monitoring target server table 610 according to the first embodiment of this invention.

The monitoring target server table 610 includes a business operation system identifier 611, a URL 612, a server address 613, a port number 614, and a monitoring time 615.

Registered as the business operation system identifier 611 is an identifier unique to a business operation system to be monitored by the operation management server 100. Alternatively, the unique identifier of a business operation (for example, business operation name) provided by a business operation system that is a monitoring target of the operation management server 100 may be registered as the business operation system identifier 611.

Registered as the URL 612 is information indicating a URL that is accessed when a part of or the entirety of a business operation provided by the business operation executing server 200 that is identified by address information registered as the server address 613 is used by another business operation executing server 200 or the client server 800.

Registered as the server address 613 is address information (for example, an IP address) by which the business operation executing server 200 that is included in the business operation system in question can be uniquely identified. Registered as the port number 614 is the number of a port for the business operation executing server 200 that is accessed when a part of or the entirety of a business operation provided by the business operation executing server 200 that is identified by the address information registered as the server address 613 is used by the client server 800 or another business operation executing server 200.

Registered as the monitoring time 615 is a default value of the length of time for which monitoring lasts in the case where the business operation executing server 200 that is identified by address information registered as the server address 613 is selected as a new monitoring target. A default value in milliseconds, for example, is stored as the monitoring time 615.

Information is registered in advance in the monitoring target server table 610. Specifically, a system administrator may register information in the monitoring target server table 610 via the input part 114, or the operation management server 100 may register in the monitoring target server table 610 info nation for the monitoring target server table 610 that is collected by a tool or utility and received by the communication processing part 116.

Figure 4:
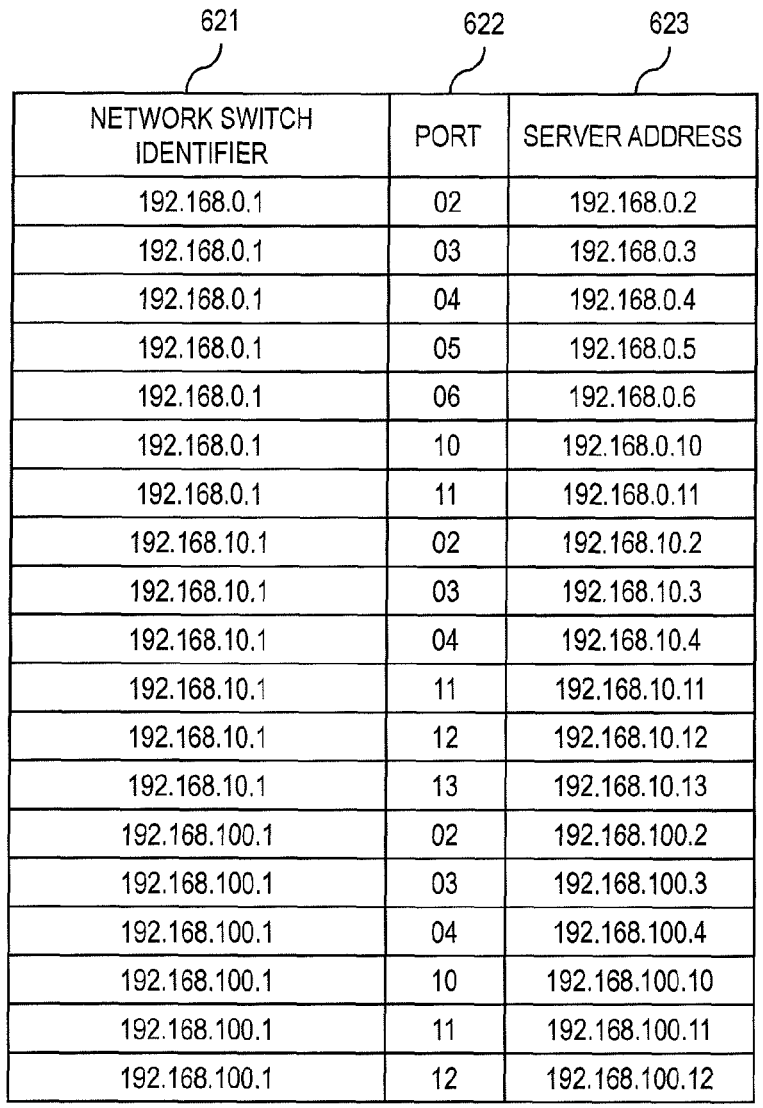
FIG. 4 is an explanatory diagram of a network configuration table according to the first embodiment of this invention.

FIG. 4 is an explanatory diagram of the network configuration table 620 according to the first embodiment of this invention.

The network configuration table 620 includes a network switch identifier 621, a port 622, and a server address 623.

Registered as the network switch identifier 621 is address information (for example, an IP address) by which the network switch 400 that is used by a business operation system can be uniquely identified. The network switch 400 that is used by a business operation system is the network switch 400 that is connected to the business operation executing servers 200 included in the business operation system.

Registered as the port 622 is the unique identifier of a port (for example, a port number) that is connected to the business operation executing servers 200 included in a business operation system out of ports provided in the network switch 400. Registered as the server address 623 is address information (for example, an IP address) by which the business operation executing server 200 included in a business operation system can be uniquely identified.

Information is registered in advance in the network configuration table 620. Specifically, the system administrator may register information in the network configuration table 620 via the input part 114, or the operation management server 100 may register in the network configuration table 620 information for the monitoring target server table 610 that is collected by a tool or utility and received by the communication processing part 116.

FIG. 5 is an explanatory diagram of the network switch setting method table 630 according to the first embodiment of this invention.

The network switch setting method table 630 includes a network switch identifier 631 and a mirroring setting method 632.

Registered as the network switch identifier 631 is address information (for example, an IP address) by which the network switch 400 that is used for a business operation system can be uniquely identified. Address information of the network switch 400 that is registered as the network switch identifier 631 corresponds to address information of the network switch 400 that is registered as the network switch identifier 621 of the network configuration table 620.

Registered as the mirroring setting method 632 is a method that is used to change monitoring target port settings of a mirror port of the network switch 400 that is identified by the address information registered as the network switch identifier 631. In the network switch 400 whose address information is "192.168.0.1" and the network switch 400 whose address information is "192.168.100.1", monitoring target ports are switched via the Web with parameters added. Monitoring target ports of the network switch 400 whose address information is "192.168.10.1" are switched by a shell script (for example, BASH).

Information is registered in advance in the network switch setting method table 630. Specifically, the system administrator may register information in the network switch setting method table 630 via the input part 114, or the operation management server 100 may register in the network switch setting method table 630 information collected by a tool or utility and received by the communication processing part 116.

FIG. 6 is an explanatory diagram of the SLA table 640 according to the first embodiment of this invention.

The SLA table 640 includes a business operation system identifier 641, a response time threshold 642, a tolerable overrun count 643, a response time 644, and a response time overrun count 645.

Registered as the business operation system identifier 641 is an identifier unique to a business operation system to be monitored by the operation management server 100. The unique identifier of a business operation system that is registered as the business operation system identifier 641 corresponds to the identifier of a business operation system that is registered as the business operation system identifier 611 of the monitoring target server table 610.

An identifier unique to a business operation (for example, business operation name) provided by a business operation system that is a monitoring target of the operation management server 100 may instead be registered as the business operation system identifier 641.

Registered as the response time threshold 642 is a threshold for a response time, which is measured from the time of reception of a request packet from the client server 800 at one of the business operation executing servers 200 included in a business operation system till the return of a response packet from the business operation executing server 200. The threshold for the response time is a value agreed upon between the system administrator and a business operation manager, a customer, or others to whom the business operation system provides the business operation. The threshold for the response time registered as the response time threshold 642 is registered in, for example, milliseconds.

Registered as the tolerable overrun count 643 is the number of times that exceeding a response time threshold that is registered as the response time threshold 642 is tolerated over a given period of time (a tolerable overrun count) for the response time of the business operation executing servers 200 included in a business operation system. The tolerable overrun count registered as the tolerable overrun count 643 is a count agreed upon between the system administrator and a business operation manager, a customer, or others to whom the business operation system provides the business operation. The given period of time is, for example, a month.

Registered as the response time 644 for each business operation system is an average value of response times of all business operation executing servers 200 included in the business operation system. Alternatively, registered as the response time 644 for each business operation system may be the response time of the business operation executing server 200 whose response time has been calculated last out of the business operation executing servers 200 included in the business operation system. A response time in milliseconds, for example, is registered as the response time 644.

Registered as the response time overrun count 645 is the number of times the response time has exceeded a response time threshold registered as the response time threshold 642 over a given period of time. The given period of time is, for example, a month.

Information is registered in advance as the business operation system identifier 641, response time threshold 642, and tolerable overrun count 643 of the SLA table 640. Specifically, the system administrator may register information as the business operation system identifier 641, response time threshold 642, and tolerable overrun count 643 of the SLA table 640 via the input part 114, or the operation management server 100 may register, as the business operation system identifier 641, response time threshold 642, and tolerable overrun count 643 of the SLA table 640, information collected by a tool or utility and received by the communication processing part 116.

Information based on a response time that is calculated by the service level calculating part 113 based on a request packet and response packet obtained by the operation management server 100 is registered as the response time 644 and response time overrun count 645 of the SLA table 640.

FIG. 7 is an explanatory diagram of the monitoring end time table 650 according to the first embodiment of this invention.

The monitoring end time table 650 includes a business operation system identifier 651, a server address 652, a monitoring end time 653, and a request packet flag 654.

Registered as the business operation system identifier 651 is an identifier unique to a business operation system to be monitored by the operation management server 100. The unique identifier of a business operation system that is registered as the business operation system identifier 651 corresponds to the unique identifier of a business operation system that is registered as the business operation system identifier 611 of the monitoring target server table 610.

An identifier unique to a business operation (for example, business operation name) provided by a business operation system which includes the monitoring target business operation executing servers 200 may instead be registered as the business operation system identifier 651.

Registered as the server address 652 is address information (for example, an IP address) by which the business operation executing server 200 that is a monitoring target can be uniquely identified. Address information of the business operation executing server 200 that is registered as the server address 652 corresponds to address information of the business operation executing server 200 that is registered as the server address 613 of the monitoring target server table 610.

Registered as the monitoring end time 653 is a time at which monitoring is ended for the monitoring target business operation executing server 200 that is identified by address information registered as the server address 652.

When the current time reaches a monitoring end time and the monitoring target port notifying part 112 selects the business operation executing server 200 that is a new monitoring target, a record that has reached the monitoring end time is deleted from the monitoring end time table 650 and a record for the new monitoring target business operation executing server 200 is registered in the monitoring end time table 650.

As the request packet flag 654, "ON" is registered for the duration between the obtainment of a request packet at the operation management server 100 and the obtainment of a response packet at the operation management server 100 in response to the request packet. In the case where "ON" remains registered as the request packet flag 654 after the current time reaches a monitoring end time, it is determined that a response packet has not been received within the time registered as the response time threshold 642 of the SLA table 640, and a count registered as the response time overrun count 654 is incremented.

FIG. 8 is an explanatory diagram of the request table 660 according to the first embodiment of this invention.

The request table 660 includes a received time 661, a next sequence number 662, a sender address 663, a sender port number 664, a destination address 665, and a destination port number 666.

Registered as the received time 661 is information indicating a year/month/day and a time at which a request packet is obtained by the operation management server 100. Registered as the next sequence number 662 is a next sequence number that is contained in header information of a request packet obtained by the operation management server 100. The next sequence number contained in header information of a request packet is the accumulated byte count of the request packet.

Registered as the sender address 663 is address information by which the client server 800 or the business operation executing server 200 that has transmitted a request packet can be uniquely identified. Registered as the sender port number 664 is the number of a port used by the client server 800 or the business operation executing server 200 that is identified by address information registered as the sender address 663.

Registered as the destination address 665 is address information by which the business operation executing server 200 that is the destination of a transmitted request packet can be uniquely identified. Address information registered as the destination address 665 associates the business operation executing server 200 that is registered in the request table 660 with the business operation executing server 200 that is registered in the monitoring target server table 610. Registered as the destination port number 666 is the number of a port used by the business operation executing server 200 that is identified by address information registered as the destination address 665.

When the packet analyzing part 117 determines that a packet obtained by the operation management server 100 is a request packet, information contained in the request packet is registered in the request table 660 by the packet analyzing part 117.

FIG. 9 is an explanatory diagram of the response table 670 according to the first embodiment of this invention.

The response table 670 includes a response time 671, an ACK sequence number 672, a sender address 673, a sender port number 674, a destination address 675, a destination port number 676, and a response result 677.

Registered as the response time 671 is a response time which is measured from the obtainment of a request packet at the operation management server 100 via a mirror port till the obtainment of a response packet that is associated with the request packet at the operation management server 100. Registered as the ACK sequence number 672 is the sequence number of a TCP protocol of a response packet. A sequence number contained in a response packet is the same number as a next sequence number contained in a request packet that is associated with the response packet, and the associated request packet is therefore identified uniquely by referring to the sequence number contained in the response packet. In other words, a response packet is associated with a request packet when the same sequence number as a sequence number that is registered as the next sequence number 662 of the request table 660 is registered as the ACK sequence number 672 for the response packet.

Registered as the sender address 673 is address information by which the business operation executing server 200 that has transmitted a response packet can be uniquely identified. Address information that is registered as the sender address 673 corresponds to address information that is registered as the destination address 665 of the request table 660.

Registered as the sender port number 674 is the number of a port used by the business operation executing server 200 that has transmitted a response packet. A port number that is registered as the sender port number 674 corresponds to a port number that is registered as the destination port number 666 of the request table 660.

Registered as the destination address 675 is address information by which the client server 800 or the business operation executing server 200 that is the destination of a response packet can be uniquely identified. Address information that is registered as the destination address 675 corresponds to address information that is registered as the sender address 663 of the request table 660.

Registered as the destination port number 676 is the number of a port used by the client server 800 or the business operation executing server 200 that is the destination of a response packet to receive packets. A port number that is registered as the destination port number 676 corresponds to a port number that is registered as the sender port number 664 of the request table 660.

Registered as the response result 677 is a response result which is contained in TCP segment data of a response packet and indicates whether or not a request packet associated with the response packet has successfully been responded to.

When the packet analyzing part 117 determines that a packet obtained by the operation management server 100 is a response packet, a response time calculated by the packet analyzing part 117 and information contained in the response packet are registered in the response table 670.

FIG. 10 is an explanatory diagram of the mirroring settings table 680 according to the first embodiment of this invention.

The mirroring settings table 680 includes a network switch identifier 681, a mirror port 682, a monitoring target port 683, and a mirroring settings changing method 684.

Registered as the network switch identifier 681 is address information (for example, an IP address) by which the network switch 400 having a mirror port from which the operation management server 100 receives packets can be uniquely identified. Address information that is registered as the network switch identifier 681 corresponds to address information that is registered as the network switch identifier 621 of the network configuration table 620.

Registered as the mirror port 682 is an identifier unique to a mirror port from which the operation management server 100 obtains packets. Registered as the monitoring target port 683 is an identifier unique to a monitoring target port. A port identifier that is registered as the monitoring target port 683 corresponds to a port identifier that is registered as the port 622 of the network configuration table 620.

Registered as the mirroring settings changing method 684 is a method of switching monitoring target ports of the network switch 400 having a mirror port from which the operation management server 100 obtains packets. In the network switch 400 whose address information is "192.168.0.1" and the network switch 400 whose address information is "192.168.100.1", monitoring target ports are switched via the Web with parameters added. Monitoring target ports of the network switch 400 whose address information is "192.168.10.1" are switched by a shell script (for example, BASH).

When the monitoring target port notifying part 112 notifies the mirroring settings changing part 118 of the fact that a new monitoring target port has been selected, the mirroring settings changing part 118 changes the mirroring settings table 680.

Figure 11:
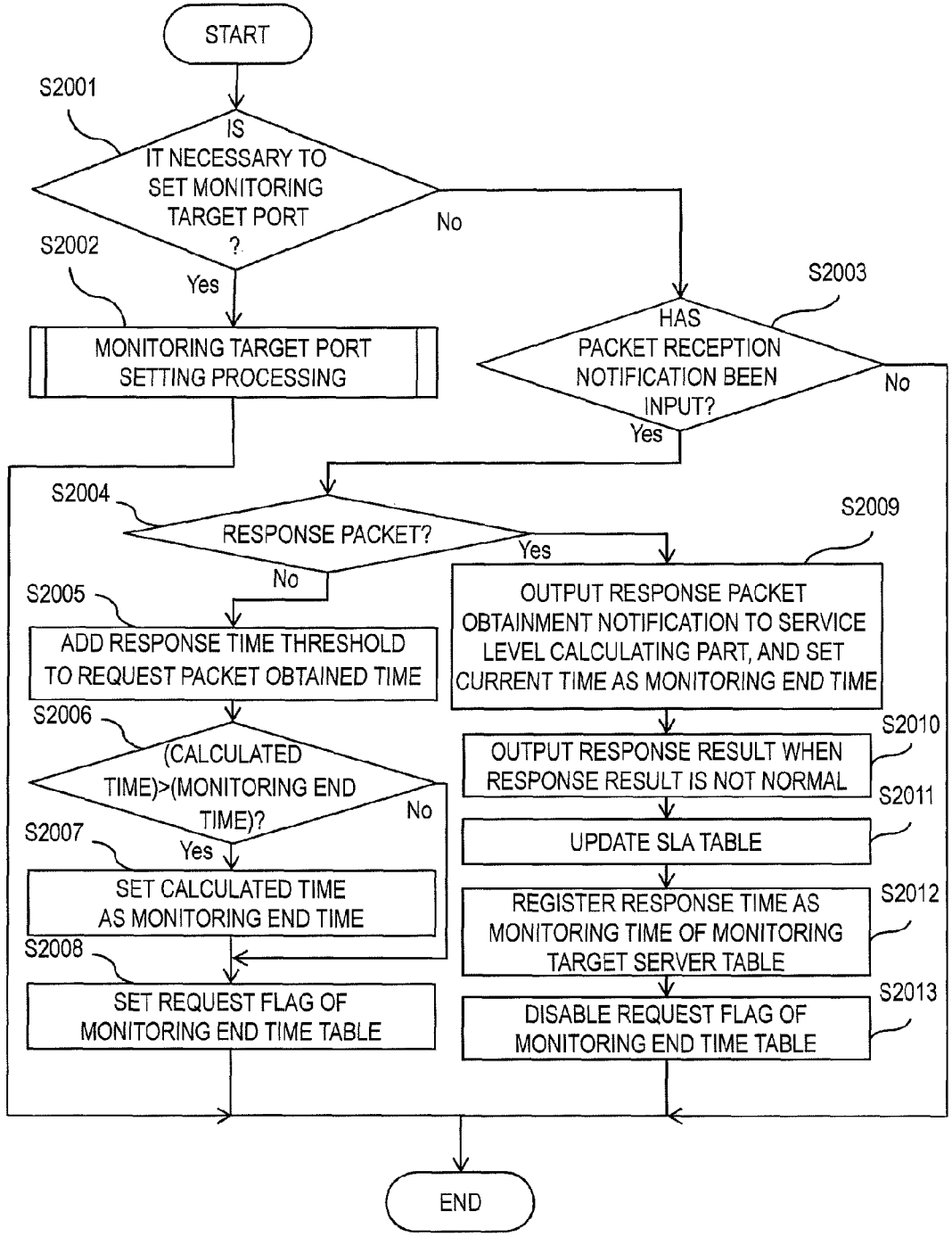
FIG. 11 is a flow chart of monitoring time measuring processing according to the first embodiment of this invention.

FIG. 11 is a flow chart of monitoring time measuring processing according to the first embodiment of this invention.

The monitoring time measuring processing includes processing in which the monitoring time measuring part 111 determines whether or not a new monitoring target port needs to be set and processing in which the monitoring time measuring part 111 updates the monitoring end time of a monitoring target port based on a packet obtained by the operation management server 100. The monitoring time measuring processing is executed cyclically.

The monitoring time measuring part 111 first refers to the monitoring end time table 650 to determine whether or not setting a new monitoring target port is necessary (Step S2001).

Specifically, the monitoring time measuring part 111 determines whether or not any records are registered in the monitoring time end table 650 in order to determine whether or not at least one of the business operation executing servers 200 is being monitored by the operation management server 100. When determining that no records are registered in the monitoring end time table 650, the monitoring time measuring part 111 determines that the operation management server 100 is not monitoring the business operation executing servers 200, and that a new monitoring target port needs to be set.

When determining that at least one record is registered in the monitoring end time table 650, in other words, when determining that at least one of the business operation executing servers 200 is being monitored by the operation management server 100, the monitoring time measuring part 111 determines whether or not there are at least one of the business operation executing servers 200 for which monitoring is to end. Specifically, the monitoring time measuring part 111 determines whether or not the monitoring end time table 650 has a record in which the current time is past a time registered as the monitoring end time 653. The monitoring time measuring part 111 determines that a new monitoring target port needs to be set when determining that the monitoring end time table 650 has a record in which the current time is past a time registered as the monitoring end time 653, and determines that setting a new monitoring target port is not necessary when determining that the monitoring end time table 650 does not have a record in which the current time is past a time registered as the monitoring end time 653.

Figure 12:
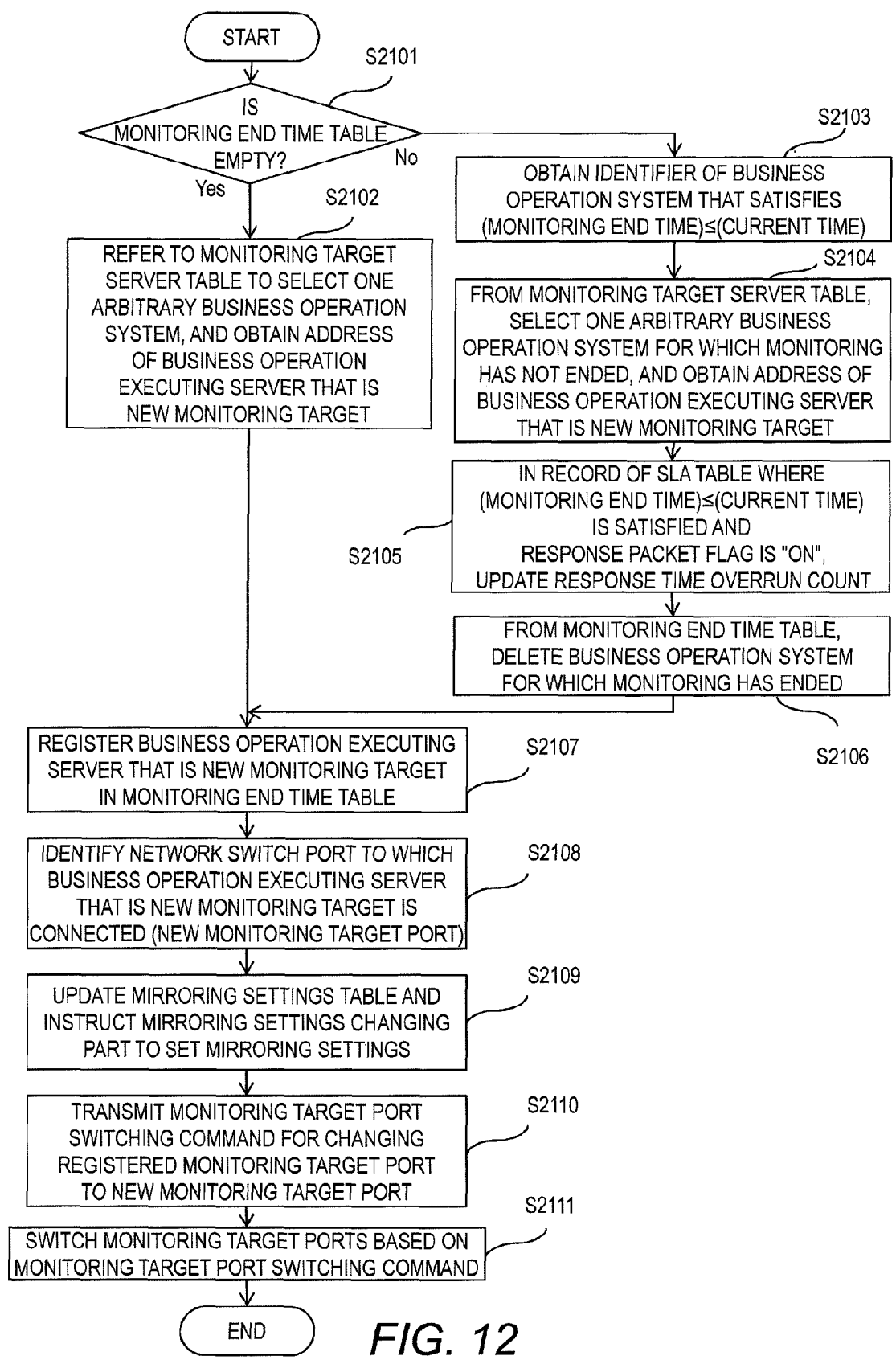
FIG. 12 is a flow chart of monitoring target port setting processing according to the first embodiment of this invention.

When it is determined in Step S2001 that a new monitoring target port needs to be set, the monitoring time measuring part 111 sends to the monitoring target port notifying part 112 a monitoring target port setting need notification, which indicates the need to set a new monitoring target port, the monitoring target port notifying part 112 executes monitoring target port setting processing illustrated in FIG. 12 (Step S2002), and the response time measuring processing is ended. The monitoring target port setting need notification includes information indicating that nothing is registered in the monitoring end time table 650, or information indicating that the monitoring end time table 650 has a record in which the current time is past the monitoring end time. Details of the monitoring target port setting processing by the monitoring target port notifying part 112 are described with reference to FIG. 12.

When it is determined in Step S2001 that setting a new monitoring target port is not necessary, on the other hand, the monitoring time measuring part 111 executes processing of updating the monitoring end time of a monitoring target port in a manner that is determined by what packet the operation management server 100 has obtained.

The monitoring time measuring part 111 first determines whether or not a packet reception notification has been input from the packet analyzing part 117 (Step S2003). The packet analyzing part 117 detects that the operation management server 100 has obtained a request packet or a response packet, and outputs a packet reception notification which indicates that a request packet or a response packet has been obtained to the monitoring time measuring part 111. Details thereof are described with reference to FIG. 13. A packet reception notification that indicates the obtainment of a request packet includes an obtained time at which the request packet has been obtained and address information of the business operation executing server 200 that is the destination of the request packet. A packet reception notification that indicates the obtainment of a response packet includes address information of the business operation executing server 200 that is the sender of the response packet, the response time of the response packet, and a response result of the response packet.

When it is determined in Step S2003 that a packet reception notification from the packet analyzing part 117 has not been input, the operation management server 100 has not obtained a packet and there is no need to execute the subsequent processing steps. The response time measuring processing is therefore ended.

When it is found in Step S2003 that a packet reception notification has been input from the packet analyzing part 117, the monitoring time measuring part 111 determines whether or not the input packet reception notification indicates the obtainment of a response packet (Step S2004).

Specifically, the monitoring time measuring part 111 determines whether or not a response result is included in the input packet reception notification, and determines that the packet reception notification indicates the obtainment of a response packet when the packet reception notification includes a response result and that the packet reception notification indicates the obtainment of a request packet when the packet reception notification does not include a response result. This is because only response packets include a response result.

When it is determined in Step S2004 that the input packet reception notification does not indicate the obtainment of a response packet, in other words, that the input packet reception notification indicates the obtainment of a request packet, the monitoring time measuring part 111 adds a response time threshold of a business operation system that includes the business operation executing server 200 that is the destination of the request packet to the obtained time of the request packet which is included in the packet reception notification (Step S2005).

How the monitoring time measuring part 111 determines the response time threshold in Step S2005 is described. The monitoring time measuring part 111 first obtains a business operation system identifier registered as the business operation system identifier 611 from a record of the monitoring target server table 610 where address information registered as the server address 613 matches address information of the business operation executing server 200 that is the destination of the request packet which is included in the packet reception notification. In this manner, the monitoring time measuring part 111 identifies a business operation system that includes the business operation executing server 200 that is the destination of the request packet which is included in the packet reception notification. The monitoring time measuring part 111 then obtains a value registered as the response time threshold 642 from a record of the SLA table 640 where a business operation system identifier registered as the business operation system identifier 641 matches the obtained business operation system identifier. The response time threshold of the business operation system that includes the business operation executing server 200 that is the destination of the request packet is identified in this manner.

The monitoring time measuring part 111 next determines whether or not the time calculated in Step S2005 is later than the monitoring end time of the business operation executing server 200 that is the destination of the request packet (Step S2006).

A description is given on how the monitoring end time of the business operation executing server 200 that is the destination of the request packet is identified. The monitoring time measuring part 111 refers to the monitoring target server table 610 to identify a business operation system that includes the business operation executing server 200 that is the destination of the request packet which is included in the packet reception notification in the manner described in the description of Step S2005. The monitoring time measuring part 111 identifies the monitoring end time of the business operation executing server 200 that is the destination of the request packet by obtaining a monitoring end time that is registered as the monitoring end time 653 from a record of the monitoring end time table 650 where a business operation system identifier registered as the business operation system identifier 651 matches the identifier of the identified business operation system.

When it is determined in Step S2006 that the time calculated in Step S2005 is later than the monitoring end time of the business operation executing server 200 that is the destination of the request packet, the monitoring time measuring part 111 sets the time calculated in Step S2005 as the monitoring end time of the business operation executing server 200 that is the monitoring target (Step S2007), and ends the monitoring time measuring processing. Specifically, the monitoring time measuring part 111 identifies a record for the business operation system that includes the business operation executing server 200 that is the destination of the request packet out of records registered in the monitoring end time table 650, and registers the time calculated in Step S2005 as the monitoring end time 653 included in the identified record.

Steps S2005 and S2006 guarantee that the monitoring time since a response packet is obtained from the business operation executing server 200 that is the destination of the request packet is equal to or longer than the response time threshold. Accordingly, even when the operation management server 100 obtains a request packet just moments before the end of the monitoring time, the business operation executing server 200 that is the destination of the request packet can be monitored until the response time threshold is reached.

The monitoring time measuring part 111 then sets a flag as the request packet flag 654 of the monitoring end time table 650 (Step S2008), and ends the monitoring time measuring processing.

In Step S2008, the monitoring time measuring part 111 sets a flag as the request packet flag 654 in a record of the monitoring end time table 650 where a business operation system identifier registered as the business operation system identifier 651 matches the identifier of the business operation system that includes the business operation executing server 200 that is the destination of the request packet which is included in the packet reception notification.

When it is determined in Step S2006 that the time calculated in Step S2005 is not later than the monitoring end time of the business operation executing server 200 that is the destination of the request packet, on the other hand, the operation management server 100 can monitor this business operation executing server 200 until the response time threshold is reached without extending the monitoring end time, and the processing therefore proceeds to Step S2008 without executing Step S2007.

When it is determined in Step S2004 that the packet reception notification input to the monitoring time measuring part 111 indicates the obtainment of a response packet, the monitoring time measuring part 111 outputs a response packet obtainment notification to the service level calculating part 113, and sets the monitoring end time of the business operation executing server 200 that is the sender of the response packet to the current time to end the monitoring of this business operation executing server 200 (Step S2009).

The response packet obtainment notification includes address information of the business operation executing server 200 that is the sender of the response packet, the identifier of a business operation system that includes this business operation executing server 200, the response time of the response packet, and a response result. The monitoring time measuring part 111 obtains a business operation system identifier registered as the business operation system identifier 611 from a record of the monitoring target server table 610 where address information registered as the server address 613 matches address information of the business operation executing server 200 that is the sender of the response packet. The monitoring time measuring part 111 includes the obtained business operation system identifier in the response packet obtainment notification as the identifier of the business operation system that includes the business operation executing server 200 that is the sender of the response packet. The response time of the response packet is included in the packet reception notification input to the monitoring time measuring part 111.

To set the monitoring end time of the business operation executing server 200 that is the sender of the response packet to the current time, the monitoring time measuring part 111 registers the current time as the monitoring end time 653 in a record of the monitoring end time table 650 where address information registered as the server address 652 matches the address information of the business operation executing server 200 that is the sender of the response packet.

Through Step S2009, the monitoring time measuring part 111 cuts back the monitoring end time of the business operation executing server 200 that is the monitoring target even when the monitoring end time is not reached because, when the operation management server 100 obtains a response packet transmitted from the monitoring target business operation executing server 200, the response time is measured once and the monitoring no longer needs to be continued. Consequently, the next time the monitoring time measuring processing is executed, setting a new monitoring target port is determined as necessary in Step S2001, and a new monitoring target port is set in Step S2002.

The cycle of switching the monitoring target business operation executing servers 200 is therefore shorter and business operation systems are monitored more efficiently in the case where the obtainment of a response packet triggers the end of the monitoring of the business operation executing server 200 that is the monitoring target than in the case where the business operation executing server 200 that is the monitoring target continues to be monitored until the monitoring end time after the response packet is obtained.

Next, when the response result included in the response packet obtainment notification input from the monitoring time measuring part 111 is not normal (when the response result is not "HTTP 1.1 200 OK"), the service level calculating part 113 outputs, from the output part 115, the address information of the business operation executing server 200, the business operation system identifier, and the response result that are included in the response packet obtainment notification (Step S2010).

The service level calculating part 113 next updates the SLA table 640 based on the response packet obtainment notification input from the monitoring time measuring part 111 (Step S2011).

Specifically, the service level calculating part 113 registers the response time included in the response packet obtainment notification as the response time 644 in a record of the SLA table 640 where a business operation system identifier registered as the business operation system identifier 641 matches the business operation system identifier included in the response packet obtainment notification.

As the response time 644 of this record, the service level calculating part 113 may instead register an average of a response time that has been registered as the response time 644 and the response time included in the response packet obtainment notification.

The monitoring time measuring part 111 next registers the response time included in the response packet obtainment notification as the monitoring time 615 in a record of the monitoring target server table 610 for the business operation executing server 200 that is the sender of the response packet (Step S2012).

An optimum monitoring time can thus be set for each business operation executing server 200 and, accordingly, business operation systems are monitored with efficiency.

Now that the associated response packet is set which is associated with a request packet for which a flag has been set as the request packet flag 654 of the monitoring end time table 650, the monitoring time measuring part 111 disables the flag set as the request flag 654 of the monitoring end time table 650 (Step S2013), and ends the monitoring time measuring processing.

Specifically, the monitoring time measuring part 111 disables a flag set as the request packet flag 654 in a record of the monitoring end time table 650 where address information registered as the server address 652 matches the address information of the business operation executing server 200 that is the sender of the response packet.

FIG. 12 is a flow chart of the monitoring target port setting processing according to the first embodiment of this invention.

The monitoring target port setting processing is processing of setting a new monitoring target port which is executed by the monitoring target port notifying part 112.

The monitoring target port notifying part 112 first determines whether or not the cause of the need to set a new monitoring target port is that no records are registered in the monitoring end time table 650 (Step S2101).

Specifically, the monitoring target port notifying part 112 determines whether or not a monitoring target port setting need notification input from the monitoring time measuring part 111 includes information indicating that nothing is registered in the monitoring end time table 650.

When it is determined in Step S2101 that the cause of the need to set a new monitoring target port is that no records are registered in the monitoring end time table 650, the monitoring target port notifying part 112 refers to the monitoring target server table 610 to obtain an arbitrary business operation system as a new monitoring target business operation system, and obtains address information of a business operation executing server that included in the obtained business operation system as a new monitoring target business operation executing server, and the processing then proceeds to Step S2107 (Step S2102).

Specifically, the monitoring target port notifying part 112 obtains, as the identifier of a new monitoring target business operation system, the identifier of one arbitrary business operation system from among business operation system identifiers registered as the business operation system identifier 611 in the monitoring target server table 610. The monitoring target port notifying part 112 then obtains address information of the business operation executing server 200 that is registered as the server address 613 from a record that has the business operation system identifier obtained as the identifier of the new business operation system out of records registered in the monitoring target server table 610.

In the case where two or more pieces of address information are obtained for two or more business operation executing servers 200, the monitoring target port notifying part 112 refers to the network configuration table 620 to determine whether or not different network switches are connected to the business operation executing servers 200 that are identified by the obtained two or more pieces of address information. In other words, the monitoring target port notifying part 112 determines whether or not the business operation executing servers 200 that are identified by the obtained two or more pieces of address information are connected to the same network switch.

When determining that the business operation executing servers 200 that are identified by the obtained two or more pieces of address information are not connected to the same network switch, the monitoring target port notifying part 112 obtains the pieces of address information of these business operation executing servers 200 as new monitoring target ports.

When determining that the business operation executing servers 200 that are identified by the obtained two or more pieces of address information are connected to the same network switch, on the other hand, the monitoring target port notifying part 112 arbitrarily selects the address information of one business operation executing server 200 out of the pieces of address information of these business operation executing servers 200, and obtains the address information of the selected business operation executing server 200 as address information of the new monitoring target business operation executing server 200. This is because, in this embodiment where one mirror port is set in one network switch 400 and a packet passing through one monitoring target port is copied to the mirror port, one network switch 400 cannot monitor a plurality of business operation executing servers 200 concurrently.

When it is found in Step S2101 that the cause of the need to set a new monitoring target port is not the lack of any registered records in the monitoring end time table 650, in other words, the cause of the need to set a new monitoring target port is the presence of at least one record in the monitoring end time table 650 where the current time is past the monitoring end time, the monitoring target port notifying part 112 obtains a business operation system identifier registered as the business operation system identifier 651 from a record where the current time is past the monitoring end time out of records registered in the monitoring end time table 650 (Step S2103).

The monitoring target port notifying part 112 obtains, arbitrarily (for example, round robin), one business operation system identifier that is not the one obtained in Step S2103 from among business operation system identifiers registered as the business operation system identifier 611 in the monitoring target server table 610. The monitoring target port notifying part 112 then obtains address information of the business operation executing server 200 that is included in a business operation system identified by the obtained business operation system identifier as address information of the new monitoring target business operation executing server 200 (Step S2104). The address information of the new monitoring target business operation executing server 200 is obtained in Step S2104 by the same method that is used in Step S2102, and a description thereof is omitted here.

The monitoring target port notifying part 112 checks a record registered in the monitoring end time table 650 where the current time is past the monitoring end time to determine whether or not "ON" is registered as the request packet flag 654, and changes the relevant value registered as the response time overrun count 645 of the SLA table 640 to an incremented value when "ON" is registered as the request packet flag 654 (Step S2105). This is because, with the monitoring time guaranteed to be within the response time threshold by Step S2007 of FIG. 11, the business operation executing server 200 for which "ON" remains registered as the request packet flag 654 after the monitoring end time passes is regarded as having failed in returning a response packet within a time period from the reception of a request packet to the response time threshold.

The monitoring target port notifying part 112 deletes a record registered in the monitoring end time table 650 where the current time is past the monitoring end time (Step S2106), and the processing proceeds to Step S2107.

The monitoring target port notifying part 112 next registers in the monitoring end time table 650 a record about the address information of the new monitoring target business operation executing server which has been obtained in Step S2102 or Step S2104 (Step S2107).

Specifically, the monitoring target port notifying part 112 registers the identifier of the new monitoring target business operation system which has been obtained in Step S2102 or Step S2104 as the business operation system identifier 651 of the monitoring end time table 650, registers the address information of the new monitoring target business operation executing server 200 which has been obtained in Step S2102 or Step S2104 as the server address 652, registers a monitoring end time that is calculated by adding a default monitoring time of the new monitoring target business operation executing server 200 to the current time as the monitoring end time 653, and registers "OFF" as the request packet flag 654. The default monitoring time of the new monitoring target business operation executing server 200 is a value registered as the monitoring time 615 in a record of the monitoring target server table 610 where address information registered as the server address 613 matches the address information of the new monitoring target business operation executing server 200 which has been obtained in Step S2102 or Step S2104.

The monitoring target port notifying part 112 refers to the network configuration table 620 to identify which of ports of the network switch 400 that is connected to the new monitoring target business operation executing server 200 is connected to the new monitoring target business operation executing server 200 (a new monitoring target port) (Step S2108).

Specifically, the monitoring target port notifying part 112 obtains from the network configuration table 620 a record where address information registered as the server address 623 matches the address information of the new monitoring target business operation executing server 200. From the obtained record, the monitoring target port notifying part 112 obtains address information of the network switch 400 that is registered as the network switch identifier 621 as address information of the network switch 400 that is connected to the new monitoring target business operation executing server 200. The monitoring target port notifying part 112 also obtains a port identifier registered as the port 622 of the obtained record as the identifier of the new monitoring target port.

The monitoring target port notifying part 112 next refers to the network switch setting method table 630 to obtain a mirroring setting method of the new monitoring target network switch 400, updates the mirroring settings table 680, and instructs the mirroring settings changing part 118 to change mirroring settings (Step S2109).

Specifically, the monitoring target port notifying part 112 obtains a mirroring setting method registered as the mirroring setting method 632 in a record of the network switch setting method table 630 where address information of the network switch 400 that is registered as the network switch identifier 631 matches the address information of the new monitoring target network switch 400 which has been obtained in Step S2108.

The monitoring target port notifying part 112 then changes the monitoring target port 683 to the identifier of the new monitoring target port which has been obtained in Step S2108 in a record of the mirroring settings table 680 where address information of the network switch 400 that is registered as the network switch identifier 681 matches the address information of the new monitoring target network switch 400 which has been obtained in Step S2108. The monitoring target port notifying part 112 also changes the mirroring settings changing method 684 of this record to the mirroring setting method obtained from the network switch setting method table 630.

The settings changing instruction issued by the monitoring target port notifying part 112 to the mirroring settings changing module 118 includes the address information of the new monitoring target network switch 400, the identifier of the new monitoring target port, and a mirroring setting method.

Next, the mirroring settings changing part 118 generates a monitoring target port switching instruction for changing the registered monitoring target port to a port that is identified by the new monitoring target port identifier included in the settings changing instruction, and uses the mirroring setting method included in the settings changing instruction to transmit the monitoring target port switching instruction to the new monitoring target network switch 400 identified by the address information of the network switch 400 that is included in the settings changing instruction (Step S2110).

The settings changing instruction only needs to include the address information of the new monitoring target network switch 400. The mirroring settings changing part 118 in this case refers to the mirroring settings table 680 to obtain, from a record where address information registered as the network switch identifier 681 matches the address information of the network switch 400 that is included in the settings changing instruction, a port identifier registered as the monitoring target port 683 as the identifier of the new monitoring target port, and to obtain a mirroring settings changing method registered as the mirroring settings changing method 684 of this record.

The monitoring target port switching instruction includes the identifier of the new monitoring target port.

Receiving the monitoring target port switching instruction from the operation management server 100, the mirroring setting part 401 of the network switch 400 switches the current monitoring target port to a port that is identified by the new monitoring target port identifier included in the received monitoring target port switching instruction (Step S2111), and ends the monitoring target port setting processing.

In this manner, when monitoring ends for a monitoring target port connected to the business operation executing server 200 that is included in a business operation system, the operation management server 100 can set as a new monitoring target port a port connected to the business operation executing server 200 that is included in one of other business operation systems than the one for which monitoring has ended.

Monitoring targets can thus be switched on a business operation system-by-business operation system basis and, in addition, because business operation systems to be monitored are switched every given period of time, many business operation systems can be monitored.

Figure 13:
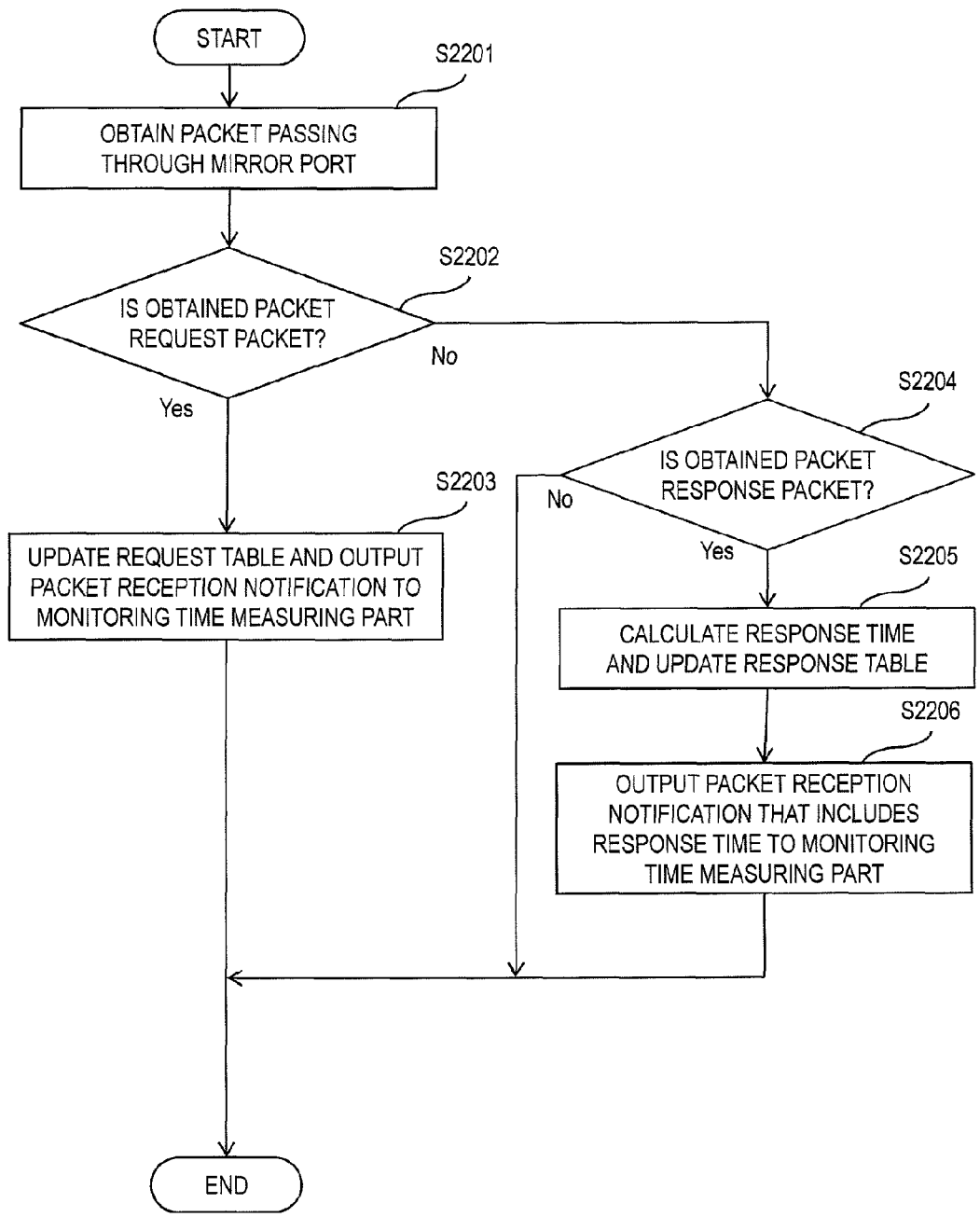
FIG. 13 is a flow chart of packet reception notifying processing according to the first embodiment of this invention.

FIG. 13 is a flow chart of packet reception notifying processing according to the first embodiment of this invention.

The packet reception notifying processing is executed by the packet analyzing part 117 cyclically. The packet reception notifying processing involves obtaining a packet passing through a mirror port, and outputting to the monitoring time measuring part 111 a packet reception notification which indicates whether the obtained packet is a request packet or a response packet.

The packet analyzing part 117 first obtains, via the communication processing part 116, a packet passing through the mirror port 404 (Step S2201).

The packet analyzing part 117 next determines whether or not the obtained packet is a request packet (Step S2202).

Specifically, the packet analyzing part 117 determines whether or not the monitoring target server table 610 includes a record in which a URL registered as the URL 612, address information registered as the server address 613, and a port number registered as the port number 614 respectively match a URL, a destination address, and a port that are contained in the obtained packet, and determines the obtained packet as a request packet when there is a record that meets the criteria.

When the obtained packet is determined as a request packet in Step S2202, the packet analyzing part 117 registers information about this request packet in the request table 660, outputs a packet reception notification indicating that the obtained packet is a request packet to the monitoring time measuring part 111 (Step S2203), and ends the packet analyzing/reception notifying processing.

Specifically, the packet analyzing part 117 registers a sender address (Addr1), a destination address (Addr2), a sender port number (port1), a destination port number (port2), a next sequence number (NN), and an obtained time (tReq) which are contained in the obtained request packet as the sender address 663, destination address 665, sender port number 664, destination port number 666, next sequence number 662, and received time 661 of the request table 660, respectively.

The packet analyzing part 117 also includes an obtained time at which the request packet has been obtained and the destination address of the request packet (address information of the business operation executing server 200) in the packet reception notification output to the monitoring time measuring part 111.

When it is determined in Step S2202 that the obtained packet is not a request packet, the packet analyzing part 117 determines whether or not the obtained packet is a response packet (Step S2204).

Specifically, the packet analyzing part 117 refers to the request table 660, and determines the obtained packet as a response packet when the request table 660 has a record in which a sender address contained in the obtained packet matches address information registered as the destination address 665 (Addr2), a sender port number contained in the obtained packet matches a port number registered as the destination port number 666 (port2), a destination address contained in the obtained packet matches address information registered as the sender address 663 (Addr1), a destination port number contained in the obtained packet matches a port number registered as the sender port number 664 (port1), and an ACK sequence number contained in the obtained packet matches a sequence number registered as the next sequence number 662 (NN). This record is of a request packet that is associated with the obtained response packet.

When it is determined in Step S2204 that the obtained packet is not a response packet, the obtained packet is neither a request packet nor a response packet, and the packet analyzing part 117 therefore ends the packet reception notifying processing without outputting a packet reception notification.

When the obtained packet is determined as a response packet in Step S2204, on the other hand, the packet analyzing part 117 calculates a response time which is a time required until the response packet is obtained since the obtainment of a request packet that is associated with the obtained response packet, and registers information about the obtained response packet in the response table 670 (Step S2205).

Specifically, the packet analyzing part 117 calculates the response time by subtracting the obtained time of the request packet (tReq) that is associated with the response packet from the obtained time of the response packet (tRes). The packet analyzing part 117 obtains the obtained time of the request packet (tReq) by referring to the received time 661 of the request table 660.

The packet analyzing part 117 then registers the ACK sequence number, the sender address, the sender port number, the destination address, the destination port number, and a response result that are contained in the obtained response packet as the ACK sequence number 672, sender address 673, sender port number 674, destination address 675, destination port number 676, and response result 677 of the response table 670, respectively. The calculated response time is registered as the response time 671 of the response table 670.

A response result contained in a response packet is information indicating whether or not a request packet has successfully been responded to. The response packet contained in the response packet includes, for example, "HTTP 1.1 200 OK" when the request packet has been responded to normally and includes, for example, "HTTP 1.1 400 Object Not Found" when the request packet has not been responded to normally. The response result is stored at the head of TCP segment data of the response packet.

The packet analyzing part 117 next outputs a packet reception notification indicating that the obtained packet is a response packet to the monitoring time measuring part 111, and ends the packet reception notifying processing. The packet reception notification indicating that the obtained packet is a response packet includes the sender address of the response packet, the response time of the response packet, and the response result of the response packet.

As described above, according to this embodiment, the monitoring targets can be switched on a business operation system-by-business operation system basis. In addition, because another business operation system is monitored when a monitoring time is passed, many business operation systems can be monitored.

Second Embodiment

A second embodiment of this invention is described below with reference to FIGS. 14 to 17.

The premise of the first embodiment is that the obtainment of request packets and response packets is always notified via the network switch 400.

However, in the case where two servers between which a request packet and a response packet are communicated (one of the business operation executing servers 200 and the client server 800) are virtual servers running on the same physical computer, the request packet and the response packet are communicated between these virtual servers via a virtual switch built on the physical computer, instead of via the network switch 400. In such cases, packets passing through a virtual switch cannot be obtained by the method of the first embodiment.

A server that transmits a request packet is written as the client server 800 even when the server functions as one of the business operation executing servers 200.

This embodiment addresses the matter by migrating, when at least two virtual servers between which a request packet and a response packet are communicated run on the same physical computer, one of these virtual servers to another physical computer so that the virtual servers sandwich the physical network switch 400. In other words, in this embodiment, one of the virtual servers is migrated to another physical computer that is connected to the physical network switch 400 that is connected to the physical computer where the other virtual server is run.

The operation management server 100 of this embodiment includes the virtual server migrating part 119 in addition to the components of the first embodiment, and the storage part 600 of this embodiment additionally stores the virtual server configuration table 690, the server spec. table 700, and the virtual server spec. table 710.

The virtual server migrating part 119 executes migration of a virtual server, details of which are described with reference to FIG. 17.

The virtual server configuration table 690 is table-format data, and stores the configurations of virtual servers that function as the business operation executing servers 200 included in business operation systems. Details of the virtual server configuration table 690 are described with reference to FIG. 14.

The server spec. table 700 is table-format data, and stores the specifications of the physical servers on which the virtual servers that function as the business operation executing servers 200 included in business operation systems run. Details of the server spec. table 700 are described with reference to FIG. 15.

The virtual server spec. table 710 is table-format data, and includes, for each virtual server, a physical server utilization ratio of the virtual server which indicates how much of a physical server the virtual server uses. Details of the virtual server spec. table 710 are described with reference to FIG. 16.

FIG. 14 is an explanatory diagram of the virtual server configuration table 690 according to the second embodiment of this invention.

The virtual server configuration table 690 includes a virtual server address 691, a communication destination server address 692, a virtual server-hosting physical server address 693, and a migration destination physical server address 694.

Registered as the virtual server address 691 is address information (for example, an IP address) of a virtual server that functions as one of the business operation executing servers 200 included in business operation systems, or a virtual server that functions as the client server 800.

Address information of a virtual server that functions as one of the business operation executing servers 200 is also registered as the server address 613 of the monitoring target server table 610. Therefore, from address information registered as the virtual server address 691 and address information registered as the server address 613 of the monitoring target server table 610, a record registered in the virtual server configuration table 690 and a record registered in the monitoring target server table 610 can be associated with each other.

Registered as the communication destination server address 692 is address information of a virtual server that functions as one of the business operation executing servers 200 included in business operation systems and that holds communication to and from the virtual server identified by the address information registered as the virtual server address 691, or a virtual server that functions as the client server 800 and that holds communication to and from the virtual server identified by the address information registered as the virtual server address 691. Alternatively, the address of a physical server that holds communication to and from the virtual server identified by the address information registered as the virtual server address 691 may be registered as the communication destination server address 692.

Registered as the virtual server-hosting physical server address 693 is address information of a physical server that runs the virtual server identified by the address information registered as the virtual server address 691.

Registered as the migration destination physical server address 694 is address information of a physical server that is the migration destination when the virtual server identified by the address information registered as the virtual server address 691 is to be migrated to another physical server from the physical server identified by the address information registered as the virtual server-hosting physical server address 693.

Information is registered in advance in the virtual server configuration table 690. Specifically, the system administrator may register information in the virtual server configuration table 690 via the input part 114, or the operation management server 100 may register in the virtual server configuration table 690 information for the monitoring target server table 610 that is collected by a tool or utility and received by the communication processing part 116.

FIG. 15 is an explanatory diagram of the server spec. table 700 according to the second embodiment of this invention.

The server spec. table 700 includes a physical server address 701, virtualizing software 702, a CPU utilization ratio 703, a memory utilization ratio 704, a disk utilization ratio 705, and a network (NW) band utilization ratio 706.

Registered as the physical server address 701 is address information by which one of the business operation executing servers 200 included in business operation systems can be identified uniquely.

Address information registered as the physical server address 701 is associated with address information registered as the virtual server-hosting physical server address 693 of the virtual server configuration table 690, or address information registered as the migration destination physical server address 694 of the virtual server configuration table 690.

Registered as the virtualizing software 702 is an identifier unique to virtualizing software that is run on the physical server identified by the address information registered as the physical server address 701. The unique identifier of virtualizing software is, for example, the name of the virtualizing software.

Registered as the CPU utilization ratio 703 is the proportion of a currently used CPU capacity (CPU utilization ratio) to the total capacity of a CPU that is provided in the physical server identified by the address information registered as the physical server address 701.

Registered as the memory utilization ratio 704 is the proportion of a currently used memory capacity (memory utilization ratio) to the total capacity of a memory that is provided in the physical server identified by the address information registered as the physical server address 701.

Registered as the disk utilization ratio 705 is the proportion of a currently used disk capacity (disk utilization ratio) to the total capacity of a disk that is provided in the physical server identified by the address information registered as the physical server address 701.

Registered as the NW band utilization ratio 706 is the proportion of a currently used communication bandwidth (NW band utilization ratio) to the total communication bandwidth that is allocated to the physical server identified by the address information registered as the physical server address 701.

The operation management server 100 collects the respective utilization ratios of each physical server in given cycles, and dynamically registers results thereof in the server spec. table 700.

FIG. 16 is an explanatory diagram of the virtual server spec. table 710 according to the second embodiment of this invention.

The virtual server spec. table 710 includes a virtual server address 711, a CPU utilization ratio 712, a memory utilization ratio 713, a disk utilization ratio 714, and a NW band utilization ratio 715.

Address information of a virtual server is registered as the virtual server address 711.

It is assumed here that every physical server that is the migration destination of a virtual server identified by address information registered as the virtual server address 711 has the same performance. Performance used by a virtual server is therefore expressed in proportions in FIG. 16.

Registered as the CPU utilization ratio 712 is the proportion of a CPU capacity that is used by the virtual server identified by the address information registered as the virtual server address 711 to the total capacity of a CPU provided in a physical server.

Registered as the memory utilization ratio 713 is the proportion of a memory capacity that is used by the virtual server identified by the address information registered as the virtual server address 711 to the total capacity of a memory provided in a physical server.

Registered as the disk utilization ratio 714 is the proportion of a disk capacity that is used by the virtual server identified by the address information registered as the virtual server address 711 to the total capacity of a disk provided in a physical server.

Registered as the NW band utilization ratio 715 is the proportion of a communication bandwidth that is used by the virtual server identified by the address information registered as the virtual server address 711 to the total bandwidth that is allocated to the physical server.

When the virtual server identified by the address information registered as the virtual server address 711 is migrated, the performance of a physical server that is the migration destination may differ from that of the migration source. In this case, the absolute values of performance used by the virtual server are registered as the CPU utilization ratio 712, the disk utilization ratio 714, and the NW band utilization ratio 715.

Figure 17:
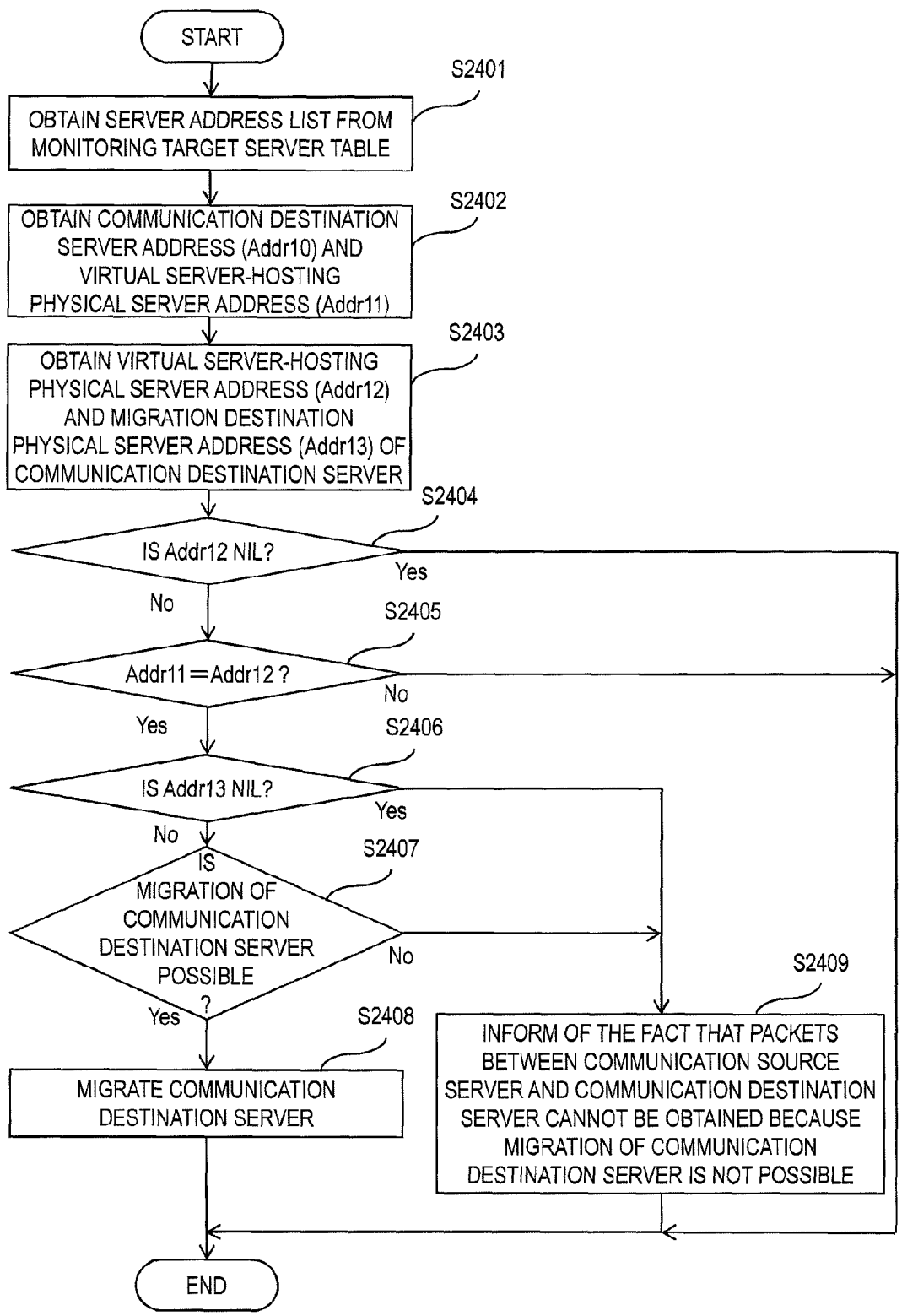
FIG. 17 is a flow chart of virtual server migration processing according to the second embodiment of this invention.

FIG. 17 is a flow chart of virtual server migration processing according to the second embodiment of this invention.

The virtual server migration processing is processing that is executed separately from the elapsed monitoring time processing of FIG. 11, and is executed by the virtual server migrating part 119 when, for example, the system is introduced.

The virtual server migrating part 119 first refers to the monitoring target server table 610 to obtain address information registered as the server address 613 (Step S2401).

The virtual server migrating part 119 next refers to the virtual server configuration table 690 to obtain, as a communication destination server address (Addr10), address information registered as the communication destination server address 692 from a record where address information registered as the virtual server address 691 matches the address information obtained in Step S2401, and to obtain, as a virtual server-hosting physical server address (Addr11), address information registered as the virtual server-hosting physical server address 693 of this record (Step S2402).

The virtual server migrating part 119 then refers to the virtual server configuration table 690 to obtain, as a virtual server-hosting physical server address (Addr12), address information registered as the virtual server-hosting physical server address 693 from a record where address information registered as the virtual server address 691 matches the communication destination server address (Addr10) obtained in Step S2402, and to obtain, as a migration destination physical server address (Addr13), address information registered as the migration destination physical server address 694 of this record (Step S2403).

The virtual server migrating part 119 next determines whether or not address information has successfully been obtained in Step S2403 as the virtual server-hosting physical server address (Addr12) (Step S2404).

This step is for determining whether or not one of the business operation executing servers 200 and the client server 800 that hold communication to and from each other are both virtual servers. For example, in the case where a server that is identified by address information obtained in Step S2401 is not a virtual server, this address information is not registered as the virtual server address 691 of the virtual server configuration table 690 in the first place. Consequently, the communication destination server address (Addr10) cannot be obtained in Step S2402, the virtual server-hosting physical server address (Addr12) cannot be obtained in Step S2403, and no address information is obtained in Step S2404 as the virtual server-hosting physical server address (Addr13). It is therefore determined that not both of the communicating business operation executing server 200 and client server 800 are virtual servers, and that at least one of these servers is a physical server.

When it is determined in Step S2404 that address information has not successfully been obtained in Step S2403 as the virtual server-hosting physical server address (Addr12), namely, that at least one of the communicating business operation executing server 200 and client server 800 is a physical server instead of both of the servers being virtual servers, there is no need to migrate a virtual server in order to ensure that the operation management server 100 obtains packets via a mirror port of the network switch 400, and the virtual server migration processing is therefore ended.

On the other hand, when it is determined in Step S2404 that address information has successfully been obtained in Step S2403 as the virtual server-hosting physical server address (Addr12), namely, that the communicating business operation executing server 200 and client server 800 are both virtual servers, the virtual server migrating part 119 determines whether or not the virtual server-hosting physical server address (Addr11) obtained in Step S2402 matches the virtual server-hosting physical server address (Addr12) obtained in Step S2403 (Step S2405). This step is for determining whether or not the two communicating virtual servers run on the same physical server.

When it is determined in Step S2405 that the virtual server-hosting physical server address (Addr11) obtained in Step S2402 does not match the virtual server-hosting physical server address (Addr12) obtained in Step S2403, in other words, when the two communicating virtual servers run on different physical servers, these two virtual servers communicate via the network switch 400 and there is no need to migrate one of the virtual servers. The virtual server migration processing is therefore ended.

On the other hand, when it is determined in Step S2405 that the virtual server-hosting physical server address (Addr11) obtained in Step S2402 matches the virtual server-hosting physical server address (Addr12) obtained in Step S2403, in other words, when the two communicating virtual servers run on the same physical server, these two virtual servers communicate without the intervention of the network switch 400. The processing therefore proceeds to Step S2406 so that the virtual server migrating part 119 migrates one of the virtual servers to another physical server.

The virtual server migrating part 119 determines whether or not address information has successfully been obtained in Step S2403 as the migration destination physical server address (Addr13) (Step S2406). This step is for determining whether or not there is a physical server that serves as the migration destination of a virtual server identified by the communication destination server address (Addr10).

When determining that address information has successfully been obtained in Step S2403 as the migration destination physical server address (Addr13), the virtual server migrating part 119 refers to the server spec. table 700 and the virtual server spec. table 710 to determine whether or not migration to a physical server that is the migration destination of the virtual server identified by the communication destination server address (Addr10) is feasible (Step S2407).

Specifically, the virtual server migrating part 119 obtains the CPU utilization ratio 703, the memory utilization ratio 704, the disk utilization ratio 705, and the NW band utilization ratio 706 from a record of the server spec. table 700 where address information registered as the physical server address 701 matches the migration destination physical server address (Addr13).

The virtual server migrating part 119 then obtains the CPU utilization ratio 712, the memory utilization ratio 713, the disk utilization ratio 714, and the NW band utilization ratio 715 from a record of the virtual server spec. table 710 where address information registered as the virtual server address 711 matches the communication destination server address (Addr10).

The virtual server migrating part 119 next adds the values of the obtained CPU utilization ratio 712, memory utilization ratio 713, disk utilization ratio 714, and NW band utilization ratio 715 to the values of the obtained CPU utilization ratio 703, memory utilization ratio 704, disk utilization ratio 705, and NW band utilization ratio 706, respectively. When the resultant values exceed 100% in even one of the columns, the virtual server migrating part 119 determines that migration to a physical server that is the migration destination of the virtual server identified by the communication destination server address (Addr10) is not feasible. When the resultant values do not exceed 100% in any of the columns, migration to a physical server that is the migration destination of the virtual server identified by the communication destination server address (Addr10) is determined as feasible.

When migration to a physical server that is the migration destination of the virtual server identified by the communication destination server address (Addr10) is determined as feasible in Step S2407, the virtual server migrating part 119 migrates the virtual server identified by the communication destination server address (Addr10) to its migration destination physical server (Step S2408), and ends the virtual server migration processing.

When it is determined in Step S2407 that migration to a physical server that is the migration destination of the virtual server identified by the communication destination server address (Addr10) is not feasible, on the other hand, the virtual server migrating part 119 informs the administrator of the fact that the operation management server 100 cannot obtain, via a mirror port of the network switch 400, packets exchanged between these virtual servers because the virtual server identified by the communication destination server address (Addr10) cannot be migrated (Step S2409), and ends the virtual server migration processing. The informing in Step S2409 can be accomplished by various methods, an example of which is to output a screen indicating that packets exchanged between the virtual servers cannot be obtained to the display device via the output part 115.

One of the virtual servers running on the same physical server and holding communication to and from each other is migrated to another physical server in the manner described above, and these virtual servers thus always hold communication to and from each other via the network switch 400. The operation management server 100 can therefore obtain packets communicated between these virtual servers.

Third Embodiment

A third embodiment of this invention is described below with reference to FIGS. 18 and 19.

The premise of the first embodiment and the second embodiment is that only one mirror port is set in one network switch 400. Accordingly, when a plurality of business operation executing servers 200 included in the same business operation system are connected to one network switch 400, the operation management server 100 can monitor only one of these business operation executing servers 200 at a time.

In this embodiment, the operation management server 100 calculates, for each network switch 400, the count of necessary mirror ports based on how many business operation executing servers 200 included in the same business operation system are connected to the network switch 400, and informs the administrator of the calculated mirror port count.

The operation management server 100 of this embodiment includes the mirror port count calculating part 120 in addition to the components of the first embodiment. The storage part 600 of this embodiment additionally stores the mirror port count definition table 720.

The mirror port count calculating part 120 calculates for each network switch 400 the count of mirror ports necessary for the network switch 400. Details of processing executed by the mirror port count calculating part 120 are described with reference to FIG. 19.

The mirror port count definition table 720 is table-format data and stores, for each network switch 400, the count of mirror ports necessary for the network switch 400 to monitor monitoring target servers. Details of the mirror port count definition table 720 are described with reference to FIG. 18.

Figure 18:
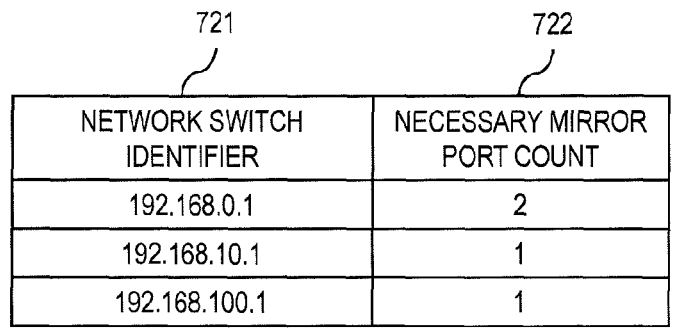
FIG. 18 is an explanatory diagram of a mirror port count definition table according to a third embodiment of this invention.

FIG. 18 is an explanatory diagram of the mirror port count definition table 720 according to the third embodiment of this invention.

The mirror port count definition table 720 includes a network switch identifier 721 and a necessary mirror port count 722.

Registered as the network switch identifier 721 is address information by which the network switch 400 can be identified uniquely. Address information registered as the network switch identifier 721 is associated with address information registered as the network switch identifier 621 of the network configuration table 620.

Registered as the necessary mirror port count 722 is the count of the mirror ports 404 necessary for the operation management server 100 to monitor monitoring target servers with the use of the network switch 400 that is identified by the address information registered as the network switch identifier 721.

The necessary mirror port count 722 of the mirror port count definition table 720 is updated with a mirror port count calculated by the mirror port count calculating part 120.

Figure 19:
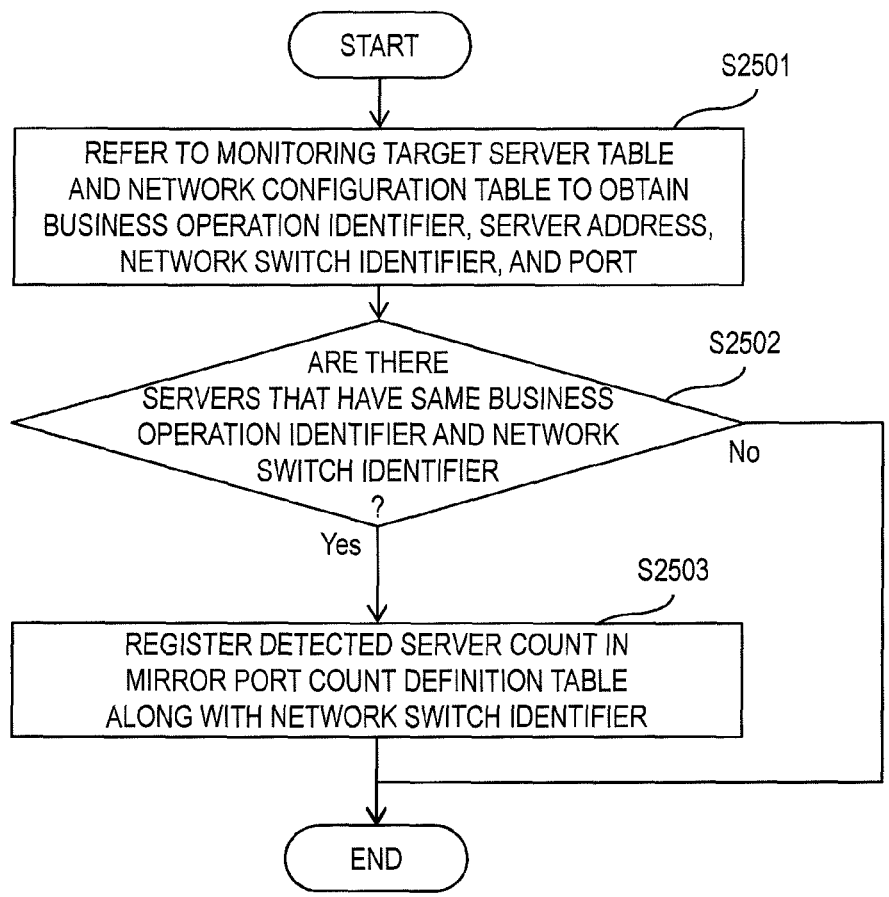
FIG. 19 is a flow chart of mirror port count calculating processing according to the third embodiment of this invention.

FIG. 19 is a flow chart of mirror port count calculating processing according to the third embodiment of this invention.

The mirror port count calculating processing is processing that is executed separately from the elapsed monitoring time processing of FIG. 11, and is executed by the mirror port count calculating part 120 when, for example, the system is introduced.

The mirror port count calculating part 120 first refers to the monitoring target server table 610 and the network configuration table 620 to obtain the identifier of a business operation system managed by the operation management server 100, address information of each of the business operation executing servers 200 included in the business operation system, address information of the network switch 400 that is connected to the business operation executing server 200, and the identifier of one of ports of the network switch 400 that is connected to the business operation executing server 200 (Step S2501).

Specifically, the mirror port count calculating part 120 refers to the monitoring target server table 610 to obtain the identifier of a business operation system that is registered as the business operation system identifier 611 in one record and to obtain address information of the business operation executing server 200 that is registered as the server address 613 in this record. The mirror port count calculating part 120 then refers to the network configuration table 620 to obtain the identifier of the network switch 400 that is registered as the network switch identifier 621 from each record where address information registered as the server address 623 matches the obtained address information of the business operation executing server, and to obtain address information registered as the server address 623 of this record.

The mirror port count calculating part 120 next determines whether or not there are the business operation executing servers 200 that share the same values for the business operation system identifier obtained in Step S2501 and the address information of the network switch 400 obtained in Step S2501 (Step S2502). This step is for determining whether or not a plurality of business operation executing servers 200 included in the same business operation system are connected to the same network switch 400.

When it is determined in Step S2502 that no business operation executing servers 200 share the same values for the business operation system identifier obtained in Step S2501 and the address information of the network switch 400 obtained in Step S2501, in other words, when a plurality of business operation executing servers 200 included in the same business operation system are not connected to the same network switch 400, the network switch 400 only needs to have one mirror port, and the mirror port count calculating processing is therefore ended.

On the other hand, when it is determined in Step S2502 that some business operation executing servers 200 share the same values for the business operation system identifier obtained in Step S2501 and the address information of the network switch 400 obtained in Step S2501, in other words, when a plurality of business operation executing servers 200 included in the same business operation system are connected to the same network switch 400, the mirror port count calculating part 120 registers the count of the business operation executing servers 200 included in the same business operation system and that are connected to the same network switch 400, and address information of this network switch in the mirror port count definition table 720 (Step S2503), and ends the mirror port count calculating processing.

Though not illustrated in FIG. 19, the mirror port count calculating part 120 may inform the administrator of the address information of the network switch 400 that has just been registered in the mirror port count definition table 720 and the count of mirror ports necessary for this network switch 400.

Based on what is informed, the administrator can set, in the network switch 400, mirror ports necessary to monitor all the business operation executing servers 200 included in the same business operation system.

Thus, even when a plurality of business operation executing servers 200 included in the same business operation system are connected to the same network switch 400, the administrator can easily set mirror ports in the network switch 400 in a number that allows the operation management server 100 to monitor all of these business operation executing servers 200.

This invention has now been described in detail with reference to the accompanying drawings. However, this invention is not limited to those concrete configurations, and encompasses various modifications and equivalent configurations without departing from the spirit of this invention which is set forth in the accompanying scope of claims.

This invention is applicable to monitoring systems for monitoring packets of business operation executing servers.

What is claimed is:

1. A business operation monitoring system, which is capable of holding communication to and from a plurality of business operation executing computers included in a plurality of business operation systems for providing business operations to a customer, and which obtains packets from the plurality of business operation executing computers to monitor the plurality of business operation systems, each of the plurality of business operation systems comprises at least one of the plurality of business operation executing computers, and the business operation monitoring system comprising executing computers configured to:
   store, in a storage area, a business operation executing computer table for managing which business operation executing computer each of the plurality of business operation systems comprises, and an end time table for managing, for each of the plurality of business operation executing computers, an end time at which the packets from each of the plurality of business operation executing computers is obtained;
   determine from the end time table whether or not the end time has arrived for one of the plurality of business operation executing computers from which a packet is currently obtained;
   when it is determined that the end time has arrived, select from the business operation executing computer table, as a new monitoring target, one of the plurality of business operation executing computers that is included in other business operation systems than one of the plurality of business operation systems that comprises the one of the plurality of business operation executing computers for which the end time has arrived;
   register the end time of the one of the plurality of business operation executing computers selected as the new monitoring target in the end time table; and
   obtain a packet from the one of the plurality of business operation executing computers selected as the new monitoring target;
   wherein, when the one of the plurality of business operation executing computers receives a request packet from a client computer, the one of the plurality of business operation executing computers transmits a response packet that is associated with the received request packet to the client computer, and
   wherein the business operation monitoring system is configured to:
      store, in the storage area, a response time table in which a regulation response time, which is a given value, is registered for the each of the plurality of business operation systems comprising the plurality of business operation executing computers, with respect to a response time, which is measured from reception of a request packet at a business operation executing computer of the plurality of business operation executing computers till the transmission of a response packet from the business operation executing computer;
      determine, when the request packet that is transmitted from the client computer to the one of the plurality of business operation executing computers that is a target of the monitoring is obtained, whether or not a time calculated by adding a current time to the regulation response time that is set for one of the plurality of business operation systems that comprises the one of the plurality of business operation executing computers that is the target of the monitoring is later than the end time of the one of the plurality of business operation executing computers that is the target of the monitoring; and
      change, when determining that the calculated time is later than the end time of the one of the plurality of business operation executing computers that is the target of the monitoring, the end time to the calculated time.

2. A business operation monitoring system according to claim 1,
   wherein, when the one of the plurality of business operation executing computers receives a request packet from a client computer, the one of the plurality of business operation executing computers transmits a response packet that is associated with the received request packet to the client computer, and
   wherein, when receiving the response packet from the one of the plurality of business operation executing computers, the business operation monitoring system determines that the end time has arrived for the one of the plurality of business operation executing computers that has transmitted the response packet, and selects the one of the plurality of business operation executing computers that is the new monitoring target.

3. A business operation monitoring system according to claim 1,
   wherein, when the one of the plurality of business operation executing computers receives a request packet from a client computer, the one of the plurality of business operation executing computers transmits a response packet that is associated with the received request packet to the client computer, and
   wherein the business operation monitoring system is configured to:
      calculate, when the response packet is received from the one of the plurality of business operation executing computers, a response time from the reception of the request packet at the one of the plurality of business operation executing computers till the transmission of the response packet from the one of the plurality of business operation executing computers;

store the calculated response time in the storage area as a value of the end time of the one of the plurality of business operation executing computers; and retrieve, when the one of the plurality of business operation executing computers is newly selected as a source for obtaining the packets, the end time that is associated with the one of the plurality of business operation executing computers as the source for obtaining the packets from the storage area, and register, in the end time table, as a time at which the monitoring ends, a time calculated by adding a current time to a value of the retrieved end time.

4. A business operation monitoring system according to claim 1, wherein, when the one of the plurality of business operation executing computers receives a request packet from a client computer, the one of the plurality of business operation executing computers transmits a response packet that is associated with the received request packet to the client computer, wherein the one of the plurality of business operation executing computers and the client computer are executable as virtual computers on one or more physical computers, and wherein, when the one of the plurality of business operation executing computers and the client computer between which the request packet and the response packet are communicated are executed as the virtual computers on the same physical computer, the business operation monitoring system migrates one of the virtual computers holding communication to and from each other to another physical computer.

5. A business operation monitoring system according to claim 1, wherein the business operation monitoring system is connected to a communication device for connecting the plurality of business operation executing computers and the business operation monitoring system, wherein the communication device is configured to:
    comprise a mirror port, which is connected to the business operation monitoring system, and ports, which are connected to the plurality of business operation executing computers; and
    copy, by mirroring, to the mirror port, the packets flowing through a monitoring target port, which is one of the ports connected to the plurality of business operation executing computers and which is connected to the one of the plurality of business operation executing computers that is a target of the monitoring, and wherein, when the one of the plurality of business operation executing computers as the new monitoring target is selected, the business operation monitoring system switches the ports so that one of the ports to which the one of the plurality of business operation executing computers as the new monitoring target is connected is now the monitoring target port.

6. A business operation monitoring system according to claim 5, wherein the business operation monitoring system is configured to:

calculate a count of business operation executing computers included in the same business operation system and that are connected to the same communication device; and inform an administrator of the calculated count of the connected business operation executing computers as a necessary mirror port count.

7. A business operation monitoring method for a business operation monitoring system, which is capable of holding communication to and from a plurality of business operation executing computers included in a plurality of business operation systems for providing business operations to a customer, and which obtains packets from the plurality of business operation executing computers to monitor the plurality of business operation systems, the plurality of business operation systems each comprising at least one of the plurality of business operation executing computers, the business operation monitoring system storing, in a storage area, a business operation executing computer table for managing which business operation executing computer each of the plurality of business operation systems comprises, and an end time table for managing, for each of the plurality of business operation executing computers, an end time at which the packets from each of the plurality of business operation executing computers is obtained, the business operation monitoring method comprising the steps of:

the business operation monitoring system determining from the end time table whether or not the end time has arrived for one of the plurality of business operation executing computers from which a packet is currently obtained;

the business operation monitoring system, when it is determined that the end time has arrived, selecting from the business operation executing computer table, as a new monitoring target, one of the plurality of business operation executing computers included in other business operation systems than one of the plurality of the business operation systems that comprises the one of the plurality of business operation executing computers for which the end time has arrived;

registering, by the business operation monitoring system, the end time of the one of the plurality of business operation executing computers selected as the new monitoring target in the end time table; and obtaining, by the business operation monitoring system, a packet from the one of the plurality of business operation executing computers selected as the new monitoring target;

wherein, when one of the plurality of business operation executing computers receives a request packet from a client computer, the one of the plurality of business operation executing computers transmits a response packet that is associated with the received request packet to the client computer, wherein the business operation monitoring system stores, in the storage area, a response time table in which a regulation response time, which is a given value, is registered for the each of the plurality of business operation systems comprising the plurality of business operation executing computers, with respect to a response time, which is measured from reception of a request packet at a business operation executing computer of the plurality of business operation executing computers till transmission of a response packet from the business operation executing computer, and wherein the business operation monitoring method further comprises the steps of:

determining, by the business operation monitoring system, when the request packet that is transmitted from the client computer to the one of the plurality of business operation executing computers that is a target of the monitoring is obtained, whether or not a time calculated by adding a current time to the regulation response time that is set for one of the plurality of business operation systems that comprises the one of the plurality of business operation executing computers that is the target of the monitoring is later than the end time of the one of the plurality of business operation executing computers that is the target of the monitoring; and changing, by the business operation monitoring system, when determining that the calculated time is later than the end time of the one of the plurality of business operation executing computers that is the target of the monitoring, the end time to the calculated time.

8. A business operation monitoring method according to claim 7, wherein, when the one of the plurality of business operation executing computers receives a request packet from a client computer, the one of the plurality of business operation executing computers transmits a response packet that is associated with the received request packet to the client computer, and wherein the business operation monitoring method further comprises a step of determining, by the business operation monitoring system, when the response packet is received from the one of the plurality of business operation executing computers, that the end time has arrived for the one of the plurality of business operation executing computers that has transmitted the response packet, and selecting the one of the plurality of business operation executing computers that is the new monitoring target.

9. A business operation monitoring method according to claim 7, wherein, when the one of the plurality of business operation executing computers receives a request packet from a client computer, the one of the plurality of business operation executing computers transmits a response packet that is associated with the received request packet to the client computer, and wherein the business operation monitoring method further comprises the steps of:

calculating, by the business operation monitoring system, when the response packet is received from the one of the plurality of business operation executing computers, a response time from the reception of the request packet at the one of the plurality of business operation executing computers till the transmission of the response packet from the one of the plurality of business operation executing computers;

storing, by the business operation monitoring system, the calculated response time in the storage area as a value of the end time of the one of the plurality of business operation executing computers; and retrieving, by the business operation monitoring system, when the one of the plurality of business operation executing computers is newly selected as a source for obtaining the packets, the end time that is associated with the one of the plurality of business operation executing computers as the source for obtaining the packets from the storage area, and registering, in the end time table, as a time at which the monitoring ends, a time calculated by adding a current time to a value of the retrieved end time.

10. A business operation monitoring method according to claim 7, wherein, when the one of the plurality of business operation executing computers receives a request packet from a client computer, the one of the plurality of business operation executing computers transmits a response packet that is associated with the received request packet to the client computer, wherein the one of the plurality of business operation executing computers and the client computer are executable as virtual computers on one or more physical computers, and wherein the business operation monitoring method further comprises a step of migrating, by the business operation monitoring system, when the one of the plurality of business operation executing computers and the client computer between which the request packet and the response packet are communicated are executed as the virtual computers on the same physical computer, one of the virtual computers holding communication to and from each other to another physical computer.

11. A business operation monitoring method according to claim 10, further comprising the steps of:

calculating, by the business operation monitoring system, a count of business operation executing computers included in the same business operation system and that are connected to the same communication device; and informing, by the business operation monitoring system, an administrator of the calculated count of the connected business operation executing computers as a necessary mirror port count.

12. A business operation monitoring method according to claim 7, wherein the business operation monitoring system is connected to a communication device for connecting the plurality of business operation executing computers and the business operation monitoring system, wherein the communication device is configured to:

comprise a mirror port, which is connected to the business operation monitoring system, and ports, which are connected to the plurality of business operation executing computers; and copy, by mirroring, to the mirror port, the packets flowing through a monitoring target port, which is one of the ports connected to the plurality of business operation executing computers and which is connected to one of the plurality of business operation executing computers that is a target of the monitoring, and wherein the business operation monitoring method further comprises a step of switching, by the business operation monitoring system, when the one of the plurality of business operation executing computers as the new monitoring target is selected, the ports so that one of the ports to which the one of the plurality of business operation executing computers as the new monitoring target is connected is now the monitoring target port.

13. A non-transitory computer-readable storage medium having stored thereon a program that controls a processor to execute processing in a business operation monitoring system, which monitors business operation systems for providing a plurality of business operations to a customer, which is capable of holding communication to and from business operation executing computers included in the business operation systems, and which comprises the processor and a storage area, the processing comprising obtaining packets from the business operation executing computers to monitor the business operation systems, each of the business operation systems comprises at least one of the business operation executing computers, the business operation monitoring system stores, in the storage area, a business operation executing computer table for managing which business operation executing computer each of the business operation systems comprises, and an end time table for managing, for each of the business operation executing computers, an end time at which the packets from each of the business operation executing computers is obtained, and the processing comprises:
- determining from to the end time table whether or not the end time has arrived for one of the business operation executing computers from which a packet is currently obtained;
- when it is determined that the end time has arrived, selecting from the business operation executing computer table, as a new monitoring target, one of the business operation executing computers included in other business operation systems than one of the business operation systems that comprises the one of business operation executing computers for which the end time has arrived;
- registering the end time of the one of business operation executing computers selected as the new monitoring target in the end time table; and
- obtaining a packet from the one of business operation executing computers selected as the new monitoring target;

wherein, when the one of the plurality of business operation executing computers receives a request packet from a client computer, the one of the plurality of business operation executing computers transmits a response packet that is associated with the received request packet to the client computer, and wherein the business operation monitoring system is configured to:

store, in the storage area, a response time table in which a regulation response time, which is a given value, is registered for the each of the plurality of business operation systems comprising the plurality of business operation executing computers, with respect to a response time, which is measured from reception of a request packet at a business operation executing computer of the plurality of business operation executing computers till the transmission of a response packet from the business operation executing computer:

determine, when the request packet that is transmitted from the client computer to the one of the plurality of business operation executing computers that is a target of the monitoring is obtained, whether or not a time calculated by adding a current time to the regulation response time that is set for one of the plurality of business operation systems that comprises the one of the plurality of business operation executing computers that is the target of the monitoring is later than the end time of the one of the plurality of business operation executing computers that is the target of the monitoring; and change, when determining that the calculated time is later than the end time of the one of the plurality of business operation executing computers that is the target of the monitoring, the end time to the calculated time.

* * * * *